US010482619B2

(12) United States Patent
Ebrahimi Afrouzi et al.

(10) Patent No.: US 10,482,619 B2
(45) Date of Patent: Nov. 19, 2019

(54) METHOD AND APPARATUS FOR COMBINING DATA TO CONSTRUCT A FLOOR PLAN

(71) Applicant: AI Incorporated, Toronto (CA)

(72) Inventors: Ali Ebrahimi Afrouzi, San Jose, CA (US); Sebastian Schweigert, Toronto (CA); Chen Zhang, Toronto (CA)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/048,179

(22) Filed: Jul. 27, 2018

(65) Prior Publication Data

US 2019/0035099 A1    Jan. 31, 2019

Related U.S. Application Data

(60) Provisional application No. 62/537,858, filed on Jul. 27, 2017, provisional application No. 62/618,964, (Continued)

(51) Int. Cl.
*G06T 7/593* (2017.01)
*G01S 17/89* (2006.01)
(Continued)

(52) U.S. Cl.
CPC ............ *G06T 7/593* (2017.01); *G01S 7/4804* (2013.01); *G01S 17/023* (2013.01); *G01S 17/48* (2013.01);
(Continued)

(58) Field of Classification Search
CPC .......... G06T 7/593; G06T 7/136; G06T 7/30; G06T 7/344; G06T 7/13; G06T 7/0002;
(Continued)

(56) References Cited

U.S. PATENT DOCUMENTS

| 5,896,488 A | 4/1999 | Jeong |
| 6,667,592 B2 | 12/2003 | Jacobs et al. |

(Continued)

OTHER PUBLICATIONS

"A Census-Based Stereo Vision Algorithm Using Modified Semi-Global Matching and Plane Fitting to Improve Matching Quality"; Martin Humenberger; IEEE 2010 (Year: 2010).*

(Continued)

*Primary Examiner* — Michael S Osinski

(57) ABSTRACT

Provided is a method and apparatus for combining perceived depths to construct a floor plan using cameras, such as depth cameras. The camera(s) perceive depths from the camera(s) to objects within a first field of view. The camera(s) is rotated to observe a second field of view partly overlapping the first field of view. The camera(s) perceives depths from the camera(s) to objects within the second field of view. The depths from the first and second fields of view are compared to find the area of overlap between the two fields of view. The depths from the two fields of view are then merged at the area of overlap to create a segment of a floor plan. The method is repeated wherein depths are perceived within consecutively overlapping fields of view and are combined to construct a floor plan of the environment as the camera is rotated.

57 Claims, 12 Drawing Sheets

Related U.S. Application Data filed on Jan. 18, 2018, provisional application No. 62/591,219, filed on Nov. 28, 2017.

(51) Int. Cl.
G06K 9/00 (2006.01)
G06N 5/04 (2006.01)
G06K 9/62 (2006.01)
G06T 7/13 (2017.01)
G01S 7/48 (2006.01)
G06K 9/20 (2006.01)
G06T 7/30 (2017.01)
G06T 7/136 (2017.01)
G06T 7/33 (2017.01)
G01S 17/48 (2006.01)
G06T 7/00 (2017.01)
G01S 17/02 (2006.01)
G05D 1/02 (2006.01)

(52) U.S. Cl.
CPC .......... G01S 17/89 (2013.01); G05D 1/0253 (2013.01); G05D 1/0274 (2013.01); G06K 9/00664 (2013.01); G06K 9/20 (2013.01); G06K 9/6202 (2013.01); G06N 5/047 (2013.01); G06T 7/0002 (2013.01); G06T 7/13 (2017.01); G06T 7/136 (2017.01); G06T 7/30 (2017.01); G06T 7/344 (2017.01); G05D 2201/0203 (2013.01); G06K 2009/2045 (2013.01); G06T 2207/10028 (2013.01)

(58) Field of Classification Search
CPC .......... G06T 17/05; G06T 2207/10028; G01S 7/4804; G01S 17/023; G01S 17/48; G01S 17/89; G01S 17/00–05; G05D 1/0253; G05D 1/0274; G06K 9/00664; G06K 9/20; G06K 9/6202; G06N 5/047; G01C 21/30; G01C 21/3638
See application file for complete search history.

(56) References Cited

U.S. PATENT DOCUMENTS

| | | | | |
|---|---|---|---|---|
| 8,558,832 B1* | 10/2013 | Cook | ................ | H04N 13/0048 |
| | | | | 345/422 |
| 8,996,292 B2 | 3/2015 | Park et al. | | |
| 9,373,190 B2* | 6/2016 | Wei | ................ | G06T 17/05 |
| 2003/0030398 A1 | 2/2003 | Jacobs et al. | | |
| 2003/0160788 A1* | 8/2003 | Buehler | ................ | G06T 15/405 |
| | | | | 345/422 |
| 2003/0229421 A1 | 12/2003 | Chmura et al. | | |
| 2006/0027404 A1 | 2/2006 | Foxlin | | |
| 2007/0293985 A1 | 12/2007 | Myeong et al. | | |
| 2010/0324769 A1* | 12/2010 | Takaoka | ................ | B25J 9/1676 |
| | | | | 701/25 |
| 2011/0123135 A1* | 5/2011 | Hsieh | ................ | G06K 9/00201 |
| | | | | 382/285 |
| 2012/0155744 A1* | 6/2012 | Kennedy | ................ | A63F 13/10 |
| | | | | 382/154 |
| 2013/0278755 A1* | 10/2013 | Starns | ................ | G01C 11/02 |
| | | | | 348/135 |
| 2014/0100693 A1* | 4/2014 | Fong | ................ | G05D 1/0274 |
| | | | | 700/253 |
| 2014/0293016 A1* | 10/2014 | Benhimane | ................ | G06T 17/00 |
| | | | | 348/50 |
| 2014/0350839 A1 | 11/2014 | Pack et al. | | |
| 2015/0109409 A1* | 4/2015 | Isogai | ................ | G06T 15/205 |
| | | | | 348/43 |
| 2015/0304545 A1* | 10/2015 | Zhou | ................ | G06T 5/50 |
| | | | | 348/47 |
| 2016/0012633 A1* | 1/2016 | Wei | ................ | G06T 17/05 |
| | | | | 345/420 |
| 2017/0214899 A1* | 7/2017 | Meier | ................ | G06T 19/006 |
| 2018/0074500 A1* | 3/2018 | Nonaka | ................ | G05B 19/00 |
| 2018/0124371 A1* | 5/2018 | Kamal | ................ | G01B 11/00 |
| 2018/0357775 A1* | 12/2018 | Wang | ................ | H04N 5/247 |
| 2019/0012818 A1* | 1/2019 | Fine | ................ | G06T 11/60 |
| 2019/0017838 A1* | 1/2019 | Ryde | ................ | G01C 21/3638 |
| 2019/0035100 A1* | 1/2019 | Ebrahimi Afrouzi | ... | G06T 7/344 |

OTHER PUBLICATIONS

"RGB-D mapping: Using Kinect-style depth cameras for dense 3D modeling of indoor environments"; Peter Henry; The International Journal of Robotics Research 2012 (Year: 2012).*

Kostavelis et al., "Stereo-Based Visual Odometry for Autonomous Robot Navigation", International Journal of Advanced Robotic Systems, 2016, https://journals.sagepub.com/doi/pdf/10.5772/62099, pp. 1 to 19.

Jaeheon Jeong, "A Divide-and-Conquer Approach for Visual Odometry with Minimally-Overlapped Multi-Camera Setup," Computer Science Graduate Theses & Dissertations, 88, 2014, https://scholar.colorado.edu/cgi/viewcontent.cgi?article=1089&context=csci_gradetds, pp. 1 to 108.

L Pari, "Image Based Visual Servoing: Estimated Image Jacobian by Using Fundamental Matrix VS Analytic Jacobian", International Conference Image Analysis and Recognition, 2008, https://link.springer.com/chapter/10.1007/978-3-540-69812-8_70, Abstract, pp. 1 to 2.

* cited by examiner

METHOD AND APPARATUS FOR COMBINING DATA TO CONSTRUCT A FLOOR PLAN

CROSS-REFERENCE TO RELATED APPLICATIONS

This application claims the benefit of Provisional Patent Application No. 62/537,858, filed Jul. 27, 2017, and claims the benefit of U.S. Provisional Patent Application No. 62/618,964, filed Jan. 18, 2018, and U.S. Provisional Patent Application No. 62/591,219, filed Nov. 28, 2017, each of which is hereby incorporated by reference. In this application, certain U.S. patents, U.S. patent applications, or other materials (e.g., articles) have been incorporated by reference. Specifically, in addition to the preceding, U.S. patent application Ser. Nos. 15/243,783, 62/208,791, 15/224,442, and 15/674,310 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF INVENTION

The present disclosure relates to floor plans, and more particularly, to the combination of depth data for the construction of a floor plan of an environment for robotic devices.

BACKGROUND OF INVENTION

Autonomous or semi-autonomous robotic devices are increasingly used within consumer homes and commercial establishments. Such devices may include a robotic vacuum cleaner, lawn mower, mop, or other similar devices. To operate autonomously or to operate with minimal (or less than fully manual) input and/or external control within a working environment, mapping methods are implemented within robotic devices such that the robotic device may autonomously create a map of the working environment and subsequently use it for navigation. Several mapping methods for robotic devices have been proposed. For example, a method for solving Simultaneous Localization And Mapping (SLAM) uses Extended Kalman Filter (EKF) techniques (see, e.g., U.S. Patent App. No. 2007/0293985, U.S. Patent App. No. 2006/0027404 and U.S. Patent App. No. 2014/0350839) for the construction of maps. The map may be considered complete when only a partial map of the working environment is constructed or it may be continuously updated to construct greater and greater portions of the working environment. This mapping method, in some implementations, captures images of the working environment, each image containing large amounts of feature points, to both create and continuously update the map. The robot localizes itself by capturing images with large amounts of feature points and comparing them to registered featured data. With an EKF technique, the pose of the robotic device and the position of features within the map of the environment are estimated and stored in a complete state vector while uncertainties in the estimates are stored in an error covariance matrix. The main drawback of using an EKF approach is the computational power required to process a large number of features having large total state vector and covariance matrix. The computational delays may limit the speed of robot movement and task performance. Additionally, the data collected in creating and updating the map requires large amounts of memory. Another issue with EKF SLAM approach is data association due to the presence of similar features in the map whereby different data association hypotheses can result in multiple distinct maps. While several data association algorithms have been developed to solve this issue, they cannot be implemented in real-time with commercially reasonable amounts of computing resources. Another issue with EKF-based SLAM approach, is the performance of the SLAM often highly depends on the accuracy of measurement noise covariance matrices, both of which are typically required a priori. Incorrect knowledge of sensor statistics can lead to degradation in performance. Furthermore, this type of SLAM method employs sophisticated techniques, often requiring considerable costs for implementation. While the high cost may be acceptable in certain cases, for mass consumerism of robotic devices a more cost-effective mapping system is needed.

Other mapping methods have been suggested in prior art wherein sensor data may be used to create an environmental map, the sensor being any one of sonar, laser, image, and the like. For example, U.S. Pat. No. 5,896,488 describes a method to map the environment using ultrasonic sensors wherein the robotic device follows along the walls while measuring distance and tracking movement to map the perimeter of the environment, however this method prevents the robotic device from performing work away from the perimeters while simultaneously mapping. U.S. Pat. No. 8,996,292 describes the construction of a grid map using distance sensors capable of detecting reflected light wherein the robotic device must rotate 360-degrees to map the area. This method is limited as the robotic device must complete a 360-degree rotation to map the area before beginning any coverage. Furthermore, similar mapping methods are often broadly explained (see, e.g., U.S. Patent App. No. 2003/0030398, U.S. Patent App. No. 2003/0229421 and U.S. Pat. No. 6,667,592), with no details given on how the sensor data is used to create the environmental map, which on its own is nontrivial.

None of the preceding discussion should be taken as a disclaimer of any of the described techniques, as the present approach may be used in combination with these other techniques in some embodiments.

SUMMARY

The following presents a simplified summary of some embodiments of the present techniques. This summary is not an extensive overview of the invention. It is not intended to limit the invention to embodiments having any described elements or to delineate the scope of the invention. Its sole purpose is to present some embodiments of the invention in a simplified form as a prelude to the more detailed description that is presented below.

Some aspects include a process of perceiving a spatial model of a working environment, the process including: capturing data by one or more sensors of a robot moving within a working environment, the data being indicative of depth to surfaces in the working environment from respective sensors of the robot at a plurality of different sensor poses within the working environment; obtaining, with one or more processors of the robot, a plurality of depth images based on the captured data, wherein: respective depth images are based on data captured from different positions within the working environment through which the robot moves, respective depth images comprise a plurality of depth data, the depth data indicating distance from respective sensors to objects within the working environment at respective sensor poses, and depth data of respective depth images correspond to respective fields of view; aligning, with one or more processors of the robot, depth data of respective depth images based on an area of overlap between the fields of view of the plurality of depth images; and determining, with one or more processors of the robot, based on alignment of the depth data, a spatial model of the working environment Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF DRAWINGS

The present techniques are described with reference to the following figures.

DETAILED DESCRIPTION OF THE INVENTIONS

Figure 1A:
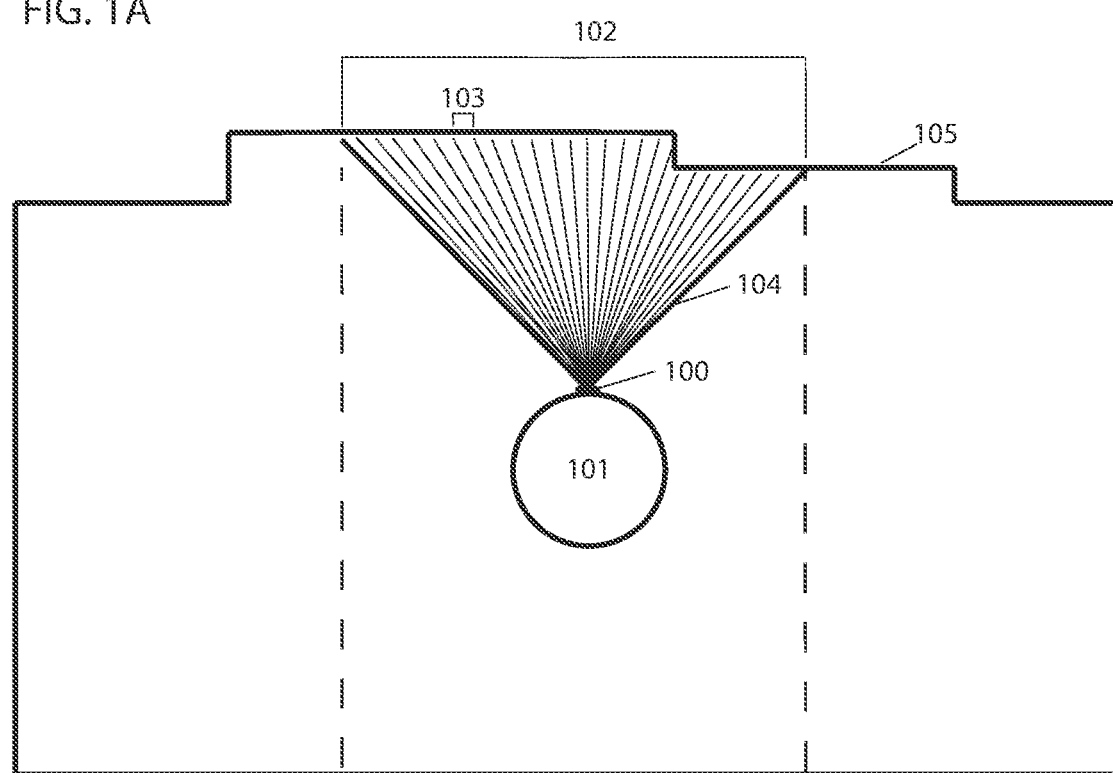
FIG. 1A illustrates depths perceived within a first field of view.

The present inventions will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present inventions, or subsets thereof, may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some of the embodiments introduced herein provide a computationally inexpensive mapping solution (or portion thereof) with minimal (or reduced) cost of implementation relative to traditional techniques. In some embodiments, mapping an environment may constitute mapping an entire environment, such that all areas of the environment are captured in the map. In other embodiments, mapping an environment may constitute mapping a portion of the environment where only some areas of the environment are captured in the map. For example, a portion of a wall within an environment captured in a single field of view of a camera and used in forming a map of a portion of the environment may constitute mapping the environment. Embodiments afford a method and apparatus for combining perceived depths to construct a floor plan of an environment using cameras capable of perceiving depths (or capable of acquiring data by which perceived depths are inferred) to objects within the environment, such as but not limited to (which is not to suggest that any other list herein is limiting), depth cameras or stereo vision cameras or depth sensors comprising, for example, an image sensor and IR illuminator. A charge-coupled device (CCD) or complementary metal oxide semiconductor (CMOS) camera positioned at an angle relative to a horizontal plane combined with at least one infrared (IR) point or line generator or any other structured form of light may also be used to perceive depths to obstacles within the environment. Objects may include, but are not limited to, articles, items, walls, boundary setting objects or lines, furniture, obstacles, etc. that are included in the floor plan. A boundary of a working environment may be considered to be within the working environment. In some embodiments, a camera is moved within an environment while depths from the camera to objects are continuously (or periodically or intermittently) perceived within consecutively overlapping fields of view. Overlapping depths from separate fields of view may be combined to construct a floor plan of the environment.

In some embodiments a camera, installed on a robotic device with at least one control system, for example, perceives depths from the camera to objects within a first field of view, e.g., such that a depth is perceived at each specified increment. Depending on the type of depth perceiving device used, depth may be perceived in various forms. The depth perceiving device may be a depth sensor, a camera, a camera coupled with IR illuminator, a stereovision camera, a depth camera, a time-of-flight camera or any other device which can infer depths from captured depth images. A depth image can be any image containing data which can be related to the distance from the depth perceiving device to objects captured in the image. For example, in one embodiment the depth perceiving device may capture depth images containing depth vectors to objects, from which the Euclidean norm of each vector can be calculated, representing the depth from the camera to objects within the field of view of the camera. In some instances, depth vectors originate at the depth perceiving device and are measured in a two-dimensional plane coinciding with the line of sight of the depth perceiving device. In other instances, a field of three-dimensional vectors originating at the depth perceiving device and arrayed over objects in the environment are measured. In another embodiment, the depth perceiving device infers depth of an object based on the time required for a light (e.g., broadcast by a depth-sensing time-of-flight camera) to reflect off of the object and return. In a further example, the depth perceiving device may comprise a laser light emitter and two image sensors positioned such that their fields of view overlap. Depth may be inferred by the displacement of the laser light projected from the image captured by the first image sensor to the image captured by the second image sensor (see, U.S. patent application Ser. No. 15/243,783, which is hereby incorporated by reference). The position of the laser light in each image may be determined by identifying pixels with high brightness (e.g., having greater than a threshold delta in intensity relative to a measure of central tendency of brightness of pixels within a threshold distance). The control system may include, but is not limited to, a system or device(s) that perform, for example, methods for receiving and storing data; methods for processing data, including depth data; methods for processing command responses to stored or processed data, to the observed environment, to internal observation, or to user input; methods for constructing a map or the boundary of an environment; and methods for navigation and other operation modes. For example, the control system may receive data from an obstacle sensor, and based on the data received, the control system may respond by commanding the robotic device to move in a specific direction. As a further example, the control system may receive image data of the observed environment, process the data, and use it to create a map of the environment. The control system may be a part of the robotic device, the camera, a navigation system, a mapping module or any other device or module. The control system may also comprise a separate component coupled to the robotic device, the navigation system, the mapping module, the camera, or other devices working in conjunction with the robotic device. More than one control system may be used. An example of a control system is described below with reference to FIG. 8.

The robot and attached camera may rotate to observe a second field of view partly overlapping the first field of view. In some embodiments, the robot and camera may move as a single unit, wherein the camera is fixed to the robot, the robot having three degrees of freedom (e.g., translating horizontally in two dimensions relative to a floor and rotating about an axis normal to the floor), or as separate units in other embodiments, with the camera and robot having a specified degree of freedom relative to the other, both horizontally and vertically. For example, but not as a limitation (which is not to imply that other descriptions are limiting), the specified degree of freedom of a camera with a 90 degrees field of view with respect to the robot may be within 0-180 degrees vertically and within 0-360 degrees horizontally. Depths may be perceived to objects within a second field of view (e.g., differing from the first field of view due to a difference in camera pose). The depths for the second field of view may be compared to those of the first field of view. An area of overlap may be identified when a number of consecutive depths from the first and second fields of view are similar, as determined with techniques like those described below. The area of overlap between two consecutive fields of view correlates with the angular movement of the camera (relative to a static frame of reference of a room) from one field of view to the next field of view. By ensuring the frame rate of the camera is fast enough to capture more than one frame of measurements in the time it takes the robotic device to rotate the width of the frame, there is always overlap between the measurements taken within two consecutive fields of view. The amount of overlap between frames may vary depending on the angular (and in some cases, linear) displacement of the robotic device, where a larger area of overlap is expected to provide data by which some of the present techniques generate a more accurate segment of the floor plan relative to operations on data with less overlap. In some embodiments, a control system infers the angular disposition of the robot from the size of the area of overlap and uses the angular disposition to adjust odometer information to overcome the inherent noise of the odometer. Further, in some embodiments, it is not necessary that the value of overlapping depths from the first and second fields of view be the exact same for the area of overlap to be identified. It is expected that measurements will be affected by noise, resolution of the equipment taking the measurement, and other inaccuracies inherent to measurement devices. Similarities in the value of depths from the first and second fields of view can be identified when the values of the depths are within a tolerance range of one another. The area of overlap may also be identified by recognizing matching patterns among the depths from the first and second fields of view, such as a pattern of increasing and decreasing values. Once an area of overlap is identified, in some embodiments, it is used as the attachment point and the two fields of view are attached to form a larger field of view. Since the overlapping depths from the first and second fields of view within the area of overlap do not necessarily have the exact same values and a range of tolerance between their values is allowed, the overlapping depths from the first and second fields of view are used to calculate new depths for the overlapping area using a moving average or another suitable mathematical convolution. This is expected to improve the accuracy of the depths as they are calculated from the combination of two separate sets of measurements. The newly calculated depths are used as the depths for the overlapping area, substituting for the depths from the first and second fields of view within the area of overlap. The new depths are then used as ground truth values to adjust all other perceived depths outside the overlapping area. Once all depths are adjusted, a first segment of the floor plan is complete. This method may be repeated such that the camera perceives depths (or pixel intensities indicative of depth) within consecutively overlapping fields of view as it moves, and the control system identifies the area of overlap and combines overlapping depths to construct a floor plan of the environment.

In some embodiments, "robot" or "robotic device" may include one or more autonomous or semi-autonomous devices having communication, an actuator, mobility, and/or processing elements. Such robots or robotic devices may, but are not required to (which is not to suggest that any other described feature is required in all embodiments), include a casing or shell, a chassis, a transport drive system such as wheels or other mobility device, a motor to drive the wheels or other mobility device, a receiver that acquires signals transmitted from, for example, a transmitting beacon, a processor and/or controller that processes and/or controls motors, methods, and operations, network or wireless communications, power management, etc., and one or more clock or synchronizing devices. Robots or robotic devices may also include a power module for delivering (and in some cases storing) electrical power, a sensor module for observing the environment and for sending commands based on the observed environment, and a control module for storage of operation modes, command responses to the observed environment or user input, and the like. The sensor module may include sensors for detecting obstacles, types of flooring, cliffs, system status, temperature, and the like or sensors for measuring movement. An interface module may also be included to provide an interface between the robot and the user. The robot or robotic device may further include IR sensors, tactile sensors, sonar sensors, gyroscopes, ultrasonic range finder sensors, depth sensing cameras, odometer sensors, optical flow sensors, LIDAR, cameras, IR illuminator, remote controls, Wi-Fi capability, network card, Bluetooth capability, cellular functionality, USB ports and RF transmitter/receiver. Other types of robots or robotic devices with other configurations may also be used.

The steps described herein may be performed in various settings, such as with a camera installed on a robotic floor cleaning device, robotic lawn mowers, and/or other autonomous and semi-autonomous robotic devices. The present inventions, in some embodiments, are expected to increase processing efficiency and reduce computational cost using principals of information theory. Information theory provides that if an event is more likely and the occurrence of the event is expressed in a message, the message has less information as compared to a message that expresses a less likely event. Information theory formalizes and quantifies the amount of information born in a message using entropy. This is true for all information that is digitally stored, processed, transmitted, calculated, etc. Independent events also have additive information. For example, a message may express, "An earthquake did not happen 15 minutes ago, an earthquake did not happen 30 minutes ago, an earthquake happened 45 minutes ago", another message may also express, "an earthquake happened 45 minutes ago". The information born in either message is the same however the second message can express the message with less bits and is therefore said to have more information than the first message. Also, by definition of information theory, the second message, which reports an earthquake, is an event less likely to occur and therefor has more information than the first message which reports the more likely event of no earthquake. The entropy is defined as number of bits per symbol in a message and is defined as $-\Sigma_i p_i \log_2(p_i)$ where $p_i$ is the probability of occurrence of the i-th possible value of the symbol. If there is a way to express, store, process or transfer a message with the same information but with fewer number of bits, it is said to have more information. In the context of an environment of a robotic device, the perimeters within the immediate vicinity of and objects closest to the robotic device are most important. Therefore, if only information of the perimeters within the immediate vicinity of and objects closest to the robotic device are processed, a lot of computational costs are saved as compared to processing empty spaces, the perimeters and all the spaces beyond the perimeters. Perimeters or objects closest to the robotic device may be, for example, 1 meter away or may be 4 meters away. Avoiding the processing of empty spaces between the robotic device and closest perimeters or objects and spaces beyond the closest perimeters or objects substantially reduces computational costs. For example, some traditional techniques construct occupancy grids that assign statuses to every possible point within an environment, such statuses including "unoccupied", "occupied" or "unknown". The method proposed herein can be considered a lossless (or less lossy) compression as an occupancy grid can be constructed at any time as needed. This is expected to save a lot of computational cost as additional information is not unnecessarily processed while access to said information is possible if required. This computational advantage enables the proposed mapping method to run on, for example, an ARM M7 microcontroller as compared to much faster CPUs used in the current state of the art, thereby reducing costs for robotic devices used within consumer homes. When used with faster CPUs, the present invention saves computational costs, allowing the CPU to process other computational needs. Some embodiments may include an application specific integrated circuit (e.g., an AI co-processor ASIC) that cooperates with a physically separate or integrated central processing unit to analyze frames of video (and depth-camera readings) in the manner described herein. In some cases, the ASIC may include a relatively large number (e.g., more than 500) arithmetic logic units configured to operate concurrently on data. in some cases, the ALUs may be configured to operate on relatively low-precision data (e.g., less than or equal to 16 bits, 8 bits, or 4 bits) to afford more parallel computing units per unit area of chip substrate. In some cases, the AI co-processor ASIC may have an independent memory interface (relative to the CPU) to memory, and in some cases, independent memory from that accessed by the CPU. In some cases, the interface may be to high bandwidth memory (HBM), e.g., as specified by the JEDEC HBM2 specification, that includes a 3-dimensional stack of dynamic random access memory. In some cases, the memory accessed by the AI-co-processor ASIC may be packed in a multi-chip package with such a 3-dimensional stack of memory, e.g., on a shared package substrate that connects to the CPU via a system board.

Other aspects of some embodiments are expected to further reduce computational costs (or increase an amount of image data processed for a given amount of computational resources). For example, in one embodiment, Euclidean norm of vectors are processed and stored, expressing the depth to perimeters in the environment with a distribution density. This approach has less loss of information when compared to some traditional techniques using an occupancy grid, which expresses the perimeter as points with an occupied status. This is a lossy compression. Information is lost at each step of the process due to the error in, for example, the reading device, the hardware word size, 8-bit processor, 16-bit processor, 32-bit processor, software word size of the reading device (using integers versus float to express a value), the resolution of the reading device, the resolution of the occupancy grid itself, etc. In this exemplary embodiment, the data is processed giving a probability distribution over the Euclidean norm of the measurements. The initial measurements begin with a triangle or Gaussian distribution and, following measurements, narrow down the overlap area between two sets of data to two possibilities that can be formulated with a Bernoulli distribution, simplifying calculations drastically. To further off-load computational costs on the robotic device, in some embodiments, some data are processed on at least one separate device, such as a docking station of the robotic device or on the cloud.

Several off-the-shelf depth perception devices express measurements as a matrix of angles and depths to the perimeter. "Measurements" can include, but are not limited to (which is not to suggest that any other description is limiting), various formats indicative of some quantified property, including binary classifications of a value being greater than or less than some threshold, quantized values that bin the quantified property into increments, or real number values indicative of a quantified property. Some traditional techniques use that data to create a computationally expensive occupancy map. In contrast, some embodiments implement a less computationally expensive approach for creating a floor plan whereby, in some cases, the output matrix of depth cameras, any digital camera (e.g., a camera without depth sensing), or other depth perceiving devices (e.g., ultrasonic or laser range finders) may be used. In some embodiments, pixel intensity of captured images is not required. In some cases, the resulting floor plan may be converted into an occupancy map.

Some embodiments afford a method and apparatus for combining perceived depths from cameras or any other depth perceiving device(s), such as a depth sensor comprising, for example, an image sensor and IR illuminator, to construct a floor plan. Cameras may include depth cameras, such as but not limited to, stereo depth cameras or structured light depth cameras or a combination thereof. A CCD or CMOS camera positioned at an angle with respect to a horizontal plane combined with an IR illuminator, such as an IR point or line generator, projecting IR dots or lines or any other structured form of light (e.g., an IR gradient, a point matrix, a grid, etc.) onto objects within the environment sought to be mapped and positioned parallel to the horizontal plane may also be used to measure depths. Other configurations are contemplated. For example, the camera may be positioned parallel to a horizontal plane (upon which the robot translates) and the IR illuminator may be positioned at an angle with respect to the horizontal plane or both the camera and IR illuminator are positioned at angle with respect to the horizontal plane. Various configurations may be implemented to achieve the best performance when using a camera and IR illuminator for measuring depths. Examples of cameras which may be used are the OmniPixel3-HS camera series from OmniVision Technologies Inc. or the UCAM-II JPEG camera series by 4D Systems Pty Ltd. Any other depth perceiving device may also be used including but not limited to ultrasound and sonar depth perceiving devices. Off-the-shelf depth measurement devices, such as depth cameras, may be used as well. Different types of lasers may be used, including but not limited to edge emitting lasers and surface emitting lasers. In edge emitting lasers the light emitted is parallel to the wafer surface and propagates from a cleaved edge. With surface emitting lasers, light is emitted perpendicular to the wafer surface. This is advantageous as a large number of surface emitting lasers can be processed on a single wafer and an IR illuminator with a high density structured light pattern in the form of, for example, dots can improve the accuracy of the perceived depth. Several co-pending applications by the same inventors that describe methods for measuring depth may be referred to for illustrative purposes. For example, one method for measuring depth comprises a laser light emitter, two image sensors and an image processor whereby the image sensors are positioned such that their fields of view overlap. The displacement of the laser light projected from the image captured by the first image sensor to the image captured by the second image sensor is extracted by the image processor and used to estimate the depth to the object onto which the laser light is projected (see, U.S. patent application Ser. No. 15/243,783). In another method two laser emitters, an image sensor and an image processor are used to measure depth. The laser emitters project light points onto an object which is captured by the image sensor. The image processor extracts the distance between the projected light points and compares the distance to a preconfigured table (or inputs the values into a formula with outputs approximating such a table) that relates distances between light points with depth to the object onto which the light points are projected (see, U.S. Patent App. No. 62/208,791). Some embodiments described in U.S. patent application Ser. No. 15/224,442 apply the depth measurement method to any number of light emitters, where for more than two emitters the projected light points are connected by lines and the area within the connected points is used to determine depth to the object. In a further example, a line laser positioned at a downward angle relative to a horizontal plane and coupled with an image sensor and processor are used to measure depth (see, U.S. patent application Ser. No. 15/674,310). The line laser projects a laser line onto objects and the image sensor captures images of the objects onto which the laser line is projected. The image processor determines distance to objects based on the position of the laser line as projected lines appear lower as the distance to the surface on which the laser line is projected increases.

In some embodiments, the information sensed by the sensor may be processed and translated into depth measurements, which, in some embodiments, may be reported in a standardized measurement unit, such as millimeter or inches, for visualization purposes, or may be reported in non-standard units. Depth may be inferred (or otherwise perceived) in various ways. For example, depths may be inferred based (e.g., exclusively based on or in combination with other inputs) on pixel intensities from a depth image captured by a depth camera. Depths may be inferred from the time it takes for an infrared light (or sound) transmitted by a sensor to reflect off of an object and return back to the depth perceiving device or by a variety of other techniques. For example, using a time-of-flight camera, depth may be estimated based on the time required for light transmitted from a robot to reflect off of an object and return to a camera on the robot, or using an ultrasonic sensor, depth may be estimated based on the time required for a sound pulse transmitted from a robot-mounted ultrasonic transducer to reflect off of an object and return to the sensor. In some embodiments, a one or more infra-red (IR) (or with other portions of the spectrum) illuminators (such as those mounted on a robot) may project light onto objects (e.g., with a spatial structured pattern (like with structured light), or by scanning a point-source of light), and the resulting projection may be sensed with one or more cameras (such as robot-mounted cameras offset from the projector in a horizontal direction). In resulting images from the one or more cameras, the position of pixels with high intensity may be used to infer depth (e.g., based on parallax, based on distortion of a projected pattern, or both in captured images). In some embodiments, raw data (e.g., sensed information from which depth has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units.

In embodiments, raw data may be provided in matrix form or in an ordered list (which is not to suggest that matrices cannot be encoded as ordered lists in program state). When the raw data of the sensor are directly used by an AI algorithm, these extra steps may be bypassed and raw data may be directly used by the algorithm, where raw values and relations between the raw values are used to perceive the environment and construct the map directly without converting raw values to depth measurements with metric or imperial units prior to inference of the map (which may include inferring or otherwise perceiving a subset of a map, like inferring a shape of a piece of furniture in a room that is otherwise mapped with other techniques). For example, in embodiments, where at least one camera coupled with at least one IR laser is used in perceiving the environment, depth may be inferred based on the position and/or geometry of the projected IR light in the image captured. For instance, some embodiments may infer map geometry (or features thereof) with a trained convolutional neural network configured to infer such geometries from raw data from a plurality of sensor poses. Some embodiments may apply a multi-stage convolutional neural network in which initial stages in a pipeline of models are trained on (and are configured to infer) a coarser-grained spatial map corresponding to raw sensor data of a two-or-three-dimensional scene and then later stages in the pipeline are trained on (and are configured to infer) finer-grained residual difference between the coarser-grained spatial map and the two-or-three-dimensional scene. Some embodiments may include three, five, ten, or more such stages trained on progressively finer-grained residual differences relative to outputs of earlier stages in the model pipeline. In some cases, objects may be detected and mapped with, for instance, a capsule network having pose invariant representations of three dimensional objects. In some cases, complexity of exploiting translational invariance may be reduced by leveraging constraints where the robot is confined to two dimensions of movement, and the output map is a two dimensional map, for instance, the capsules may only account for pose invariance within a plane. A digital image from the camera may be used to detect the position and/or geometry of IR light in the image by identifying pixels with high brightness (or outputs of transformations with high brightness, like outputs of edge detection algorithms). This may be used directly in perceiving the surroundings and constructing a map of the environment. The raw pixel intensity values may be used to determine the area of overlap between data captured within overlapping fields of view in order to combine data and construct a map of the environment. In the case of two overlapping images, the area in which the two images overlap contain similar arrangement of pixel intensities in at least a portion of the digital image. This similar arrangement of pixels may be detected and the two overlapping images may be stitched at overlapping points to create a segment of the map of the environment without processing the raw data into depth measurements. An example of this process is illustrated in FIGS. 9A and 9B and FIGS. 10A-10C and is described in further detail below.

As a further example, raw time-of-flight data measured for multiple points within overlapping fields of view may be compared and used to find overlapping points between captured data without translating the raw times into depth measurements, and in some cases, without first triangulating multiple depth measurements from different poses to the same object to map geometry of the object. The area of overlap may be identified by recognizing matching patterns among the raw data from the first and second fields of view, such as a pattern of increasing and decreasing values. Matching patterns may be detected by using similar methods as those discussed herein for detecting matching patterns in depth values perceived from two overlapping fields of views. This technique, combined with the movement readings from the gyroscope or odometer and/or the convolved function of the two sets of raw data can be used to infer a more accurate area of overlap in some embodiments. Overlapping raw data may then be combined in a similar manner as that described above for combing overlapping depth measurements. Accordingly, some embodiments do not require that raw data collected by the sensor be translated into depth measurements or other processed data (which is not to imply that "raw data" may not undergo at least some processing between when values are sensed by a sensor and when the raw data is subject to the above techniques, for instance, charges on charge-coupled image sensors may be serialized, normalized, filtered, and otherwise transformed without taking the result out of the ambit of "raw data").

In some embodiments, depths may be determined by measuring a vector with the robot (or camera) at the origin and extending to an object and calculating the Euclidean norm of the vector. Structure of data used in inferring depths may have various forms. For example, a matrix containing pixel position, color, brightness, and intensity or a finite ordered list containing x, y position and norm of vectors measured from the camera to objects in a two-dimensional plane or a list containing time-of-flight of light signals emitted in a two-dimensional plane between camera and objects in the environment. For ease of visualization, data from which depth is inferred may be converted and reported in the format of millimeters or inches of depth; however, this is not a requirement, which is not to suggest that other described features are required. For example, pixel intensities from which depth may be inferred may be converted into meters of depth for ease of visualization, or they may be used directly given that the relation between pixel intensity and depth is known. To reduce computational expense, the extra step of converting data from which depth may be inferred into a specific format can be eliminated, which is not to suggest that any other feature here may not also be omitted in some embodiments. The methods of perceiving or otherwise inferring depths and the formats of reporting depths used herein are for illustrative purposes and are not intended to limit the invention, again which is not to suggest that other descriptions are limiting. Depths may be perceived (e.g., measured or otherwise inferred) in any form and be reported in any format.

In one embodiment, a camera, installed on a robotic device, for example, perceives depths from the camera to objects within a first field of view. Depending on the type of depth perceiving device used, depth data may be perceived in various forms. In one embodiment the depth perceiving device may measure a vector to the perceived object and calculate the Euclidean norm of each vector, representing the depth from the camera to objects within the first field of view. The $L^P$ norm is used to calculate the Euclidean norm from the vectors, mapping them to a positive scalar that represents the depth from the camera to the observed object. The $L^P$ norm is given by $\|x\|_P = (|x_i|^P)^{1/P}$ whereby the Euclidean norm uses P=2. In some embodiments, this data structure maps the depth vector to a feature descriptor to improve frame stitching, as described, for example, in U.S. patent application Ser. No. 15/954,410, the contents of which are hereby incorporated by reference. In some embodiments, the depth perceiving device may infer depth of an object based on the time required for a light to reflect off of the object and return. In a further example, depth to objects may be inferred using the quality of pixels, such as brightness, intensity, and color, in captured images of the objects, and in some cases, parallax and scaling differences between images captured at different camera poses. It is noted that each step taken in the process of transforming a matrix of pixels, for example, each having a tensor of color, intensity and brightness, into a depth value in millimeters or inches is a loss and computationally expensive compression and further reduces the state space in each step when digitizing each quality. In order to reduce the loss and computational expenses, it is desired and useful to omit intermediary steps if the goal can be accomplished without them. Based on information theory principal, it is beneficial to increase content for a given number of bits. For example, reporting depth in specific formats, such as metric units, is only necessary for human visualization. In implementation, such steps can be avoided to save computational expense and loss of information. The amount of compression and the amount of information captured and processed is a trade-off, which a person of ordinary skill in the art can balance to get the desired result with the benefit of this disclosure.

The angular resolution of perceived depths is varied in different implementations but generally depends on the camera resolution, the illuminating light, and the processing power for processing the output. For example, if the illuminating light generates distinctive dots very close to one another, the resolution of the device is improved. The algorithm used in generating the vector measurement from the illuminated pixels in the camera also has an impact on the overall angular resolution of the measurements. In some embodiments, depths are perceived in one-degree increments. In other embodiments, other incremental degrees may be used depending on the application and how much resolution is needed for the specific task or depending on the robotic device and the environment it is running in. For robotic devices used within consumer homes, for example, a low-cost, low-resolution camera can generate enough measurement resolution. For different applications, cameras with different resolutions can be used. In some depth cameras, for example, a depth measurement from the camera to an obstacle in the surroundings is provided for each angular resolution in the field of view.

In some embodiments, the robotic device together with the mounted camera rotates to observe a second field of view partly overlapping the first field of view. The camera is used to perceive depths from the camera to objects within the second field of view. In some embodiments, the amount of rotation between two consecutively observed fields of view varies. In some cases, the amount of overlap between the two consecutive fields of view depends on the angular displacement of the robotic device as it moves from taking measurements within one field of view to taking measurements within the next field of view, or a robot may have two or more cameras at different positions (and thus poses) on the robot to capture two fields of view, or a single camera may be moved on a static robot to capture two fields of view from different poses. In some embodiments, the mounted camera rotates (or otherwise scans, e.g., horizontally and vertically) independently of the robotic device. In such cases, the rotation of the mounted camera in relation to the robotic device is measured. In another embodiment, the values of depths perceived within the first field of view are adjusted based on the predetermined or measured angular (and in some cases, linear) movement of the depth perceiving device.

In some embodiments, the depths from the first field of view are compared with the depths from the second field of view. An area of overlap between the two fields of view is identified (e.g., determined) when (e.g., during evaluation a plurality of candidate overlaps) a number of consecutive (e.g., adjacent in pixel space) depths from the first and second fields of view are equal or close in value. Although the value of overlapping perceived depths from the first and second fields of view may not be exactly the same, depths with similar values, to within a tolerance range of one another, can be identified (e.g., determined to correspond based on similarity of the values). Furthermore, identifying matching patterns in the value of depths perceived within the first and second fields of view can also be used in identifying the area of overlap. For example, a sudden increase then decrease in the depth values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the perceived depths, can also be used to estimate the area of overlap. A Jacobian and Hessian matrix can be used to identify such similarities. The Jacobian m×n matrix can be represented as:

$$J = \begin{bmatrix} \frac{\partial f_1}{\partial x_1} & \cdots & \frac{\partial f_1}{\partial x_n} \\ \vdots & \ddots & \vdots \\ \frac{\partial f_m}{\partial x_1} & \cdots & \frac{\partial f_m}{\partial x_n} \end{bmatrix}$$

where $f$ is a function with input vector $x=(x_1, \ldots, x_n)$. The Jacobian matrix generalizes the gradient of a function of multiple variables. If the function $f$ is differentiable at a point x, the Jacobian matrix provides a linear map of the best linear approximation of the function $f$ near point x. If the gradient of function $f$ is zero at point x, then x is a critical point. To identify if the critical point is a local maximum, local minimum or saddle point, the Hessian matrix can be calculated, which when compared for the two sets of overlapping depths, can be used to identify overlapping points. This proves to be relatively computationally inexpensive. The Hessian matrix is related to Jacobian matrix by:

$$H=J(\nabla f(x))$$

In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric can be used to indicate how good of an overlap there is between the two sets of perceived depths. For example, the Szymkiewicz-Simpson coefficient is calculated by dividing the number of overlapping readings between two overlapping sets of data, X and Y for example, by the number of readings of the smallest of the two data sets:

$$\text{overlap}(X, Y) = \frac{|X \cap Y|}{\min(|X|, |Y|)}$$

The data sets are a string of values, the values being the Euclidean norms in the context of some embodiments. A larger overlap coefficient indicates higher accuracy. In some embodiments lower coefficient readings are raised to the power of alpha, alpha being a number between 0 and 1 and are stored in a table with the Szymkiewicz-Simpson coefficient.

Or some embodiments may determine an overlap with a convolution. Some embodiments may implement a kernel function that determines an aggregate measure of differences (e.g., a root mean square value) between some or all of a collection of adjacent depth readings in one image relative to a portion of the other image to which the kernel function is applied. Some embodiments may then determine the convolution of this kernel function over the other image, e.g., in some cases with a stride of greater than one pixel value. Some embodiments may then select a minimum value of the convolution as an area of identified overlap that aligns the portion of the image from which the kernel function was formed with the image to which the convolution was applied.

In some embodiments, images may be preprocessed before determining overlap. For instance, some embodiments may infer an amount of displacement of the robot between images, e.g., by integrating readings from an inertial measurement unit or odometer (in some cases after applying a Kalman filter), and then transform the origin for vectors in one image to match an origin for vectors in the other image based on the measured displacement, e.g., by subtracting a displacement vector from each vector in the subsequent image. Further, some embodiments may down-res images to afford faster matching, e.g., by selecting every other, every fifth, or more or fewer vectors, or by averaging adjacent vectors to form two lower-resolution versions of the images to be aligned. The resulting alignment may then be applied to align the two higher resolution images.

In some embodiments, computations may be expedited based on a type of movement of the robot between images. For instance, some embodiments may determine if the robot's displacement vector between images has less than a threshold amount of vertical displacement (e.g., is zero). In response, some embodiments may apply the above described convolution in with a horizontal stride and less or zero vertical stride, e.g., in the same row of the second image from which vectors are taken in the first image to form the kernel function.

In some embodiments, the area of overlap is expanded to include a number of depths perceived immediately before and after (or spatially adjacent) the perceived depths within the identified overlapping area. Once an area of overlap is identified (e.g., as a bounding box of pixel positions or threshold angle of a vertical plane at which overlap starts in each field of view), a larger field of view is constructed by combining the two fields of view using the perceived depths within the area of overlap as the attachment points. Combining may include transforming vectors with different origins into a shared coordinate system with a shared origin, e.g., based on an amount of translation or rotation of a depth sensing device between frames, for instance, by adding a translation or rotation vector to depth vectors. The transformation may be performed before, during, or after combining. The method of using the camera to perceive depths within consecutively overlapping fields of view and the control system to identify the area of overlap and combine perceived depths at identified areas of overlap is repeated, e.g., until all areas of the environment are discovered and a floor plan is constructed.

The resulting floor plan may be encoded in various forms. For instance, some embodiments may construct a point cloud of two dimensional or three dimensional points by transforming each of the vectors into a vector space with a shared origin, e.g., based on the above-described displacement vectors, in some cases with displacement vectors refined based on measured depths. Or some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when mapping. Vectors need not be labeled as "vectors" in program code to constitute vectors, which is not to suggest that other mathematical constructs are so limited. In some embodiments, vectors may be encoded as tuples of scalars, as entries in a relational database, as attributes of an object, etc. Similarly, it should be emphasized that images need not be displayed or explicitly labeled as such to constitute images. Moreover, sensors may undergo some movement while capturing a given image, and the "pose" of a sensor corresponding to a depth image may, in some cases, be a range of poses over which the depth image is captured.

In some embodiments, maps may be three dimensional maps, e.g., indicating the position of walls, furniture, doors, and the like in a room being mapped. In some embodiments, maps may be two dimensional maps, e.g., point clouds or polygons or finite ordered list indicating obstructions at a given height (or range of height, for instance from zero to 5 or 10 centimeters or less) above the floor. Two dimensional maps may be generated from two dimensional data or from three dimensional data where data at a given height above the floor is used and data pertaining to higher features are discarded. Maps may be encoded in vector graphic formats, bitmap formats, or other formats.

The robotic device may, for example, use the floor plan map to autonomously navigate the environment during operation, e.g., accessing the floor plan to determine that a candidate route is blocked by an obstacle denoted in the floor plan, to select a route with a route-finding algorithm from a current point to a target point, or the like. In some embodiments, the floor plan is stored in memory for future use. Storage of the floor plan may be in temporary memory such that a stored floor plan is only available during an operational session or in more permanent forms of memory such that the floor plan is available at the next session or startup. In some embodiments, the floor plan is further processed to identify rooms and other segments. In some embodiments, a new floor plan is constructed at each use, or an extant floor plan is updated based on newly acquired data Some embodiments may reference previous maps during subsequent mapping operations. For example, embodiments may apply Bayesian techniques to simultaneous localization and mapping and update priors in existing maps based on mapping measurements taken in subsequent sessions. Some embodiments may reference previous maps and classifying objects in a field of view as being moveable objects upon detecting a difference of greater than a threshold size.

To ensure an area of overlap exists between depths perceived within consecutive frames of the camera, the frame rate of the camera should be fast enough to capture more than one frame of measurements in the time it takes the robotic device to rotate the width of the frame. This is expected to guarantee that at least a minimum area of overlap exists if there is angular displacement, though embodiments may also operate without overlap in cases where stitching is performed between images captured in previous sessions or where images from larger displacements are combined. The amount of overlap between depths from consecutive fields of view is dependent on the amount of angular displacement from one field of view to the next field of view. The larger the area of overlap, the more accurate the map segment constructed from the overlapping depths. If a larger portion of depths making up the floor plan segment are the result of a combination of overlapping depths from at least two overlapping fields of view, accuracy of the floor plan segment is improved as the combination of overlapping depths provides a more accurate reading. Furthermore, with a larger area of overlap, it is easier to find the area of overlap between depths from two consecutive fields of view as more similarities exists between the two sets of data. In some cases, a confidence score is calculated for overlap determinations, e.g., based on an amount of overlap and aggregate amount of disagreement between depth vectors in the area of overlap in the different fields of view, and the above Bayesian techniques down-weight updates to priors based on decreases in the amount of confidence. In some embodiments, the size of the area of overlap is used to determine the angular movement and is used to adjust odometer information to overcome inherent noise of the odometer (e.g., by calculating an average movement vector for the robot based on both a vector from the odometer and a movement vector inferred from the fields of view). The angular movement of the robotic device from one field of view to the next may, for example, be determined based on the angular increment between vector measurements taken within a field of view, parallax changes between fields of view of matching objects or features thereof in areas of overlap, and the number of corresponding depths overlapping between the two fields of view.

In some embodiments, prior to perceiving depths within the second field of view, an adjustment range is calculated based on expected noise, such as measurement noise, robotic device movement noise, and the like. The adjustment range is applied with respect to depths perceive within the first field of view and is the range within which overlapping depths from the second field of view are expected to fall within.

In another embodiment, a weight is assigned to each perceived depth. The value of the weight is determined based on various factors, such as quality of the reading, the perceived depth's position with respect to the adjustment range, the degree of similarity between depths recorded from separate fields of view, the weight of neighboring depths, or the number of neighboring depths with high weight. In some embodiments, depths with weights less than an amount (such as a predetermined or dynamically determined threshold amount) are ignored as depths, with higher weight are considered to be more accurate. In some embodiments, increased weight is given to overlapping depths with a larger area of overlap, and less weight is given to overlapping depths with a smaller area of overlap. In some embodiments, the weight assigned to readings is proportional to the size of the overlap area identified. For example, data points corresponding to a moving object captured in one or two frames overlapping with several other frames captured without the moving object are assigned a low weight as they likely do not fall within the adjustment range and are not consistent with data points collected in other overlapping frames and would likely be rejected for having low assigned weight.

In some embodiments, more than two consecutive fields of view overlap, resulting in more than two sets of depths falling within an area of overlap. This may happen when the amount of angular movement between consecutive fields of view is small, especially if the frame rate of the camera is fast such that several frames within which vector measurements are taken are captured while the robotic device makes small movements, or when the field of view of the camera is large or when the robotic device has slow angular speed and the frame rate of the camera is fast. Higher weight may be given to depths within areas of overlap where more than two sets of depths overlap, as increased number of overlapping sets of depths provide a more accurate ground truth. In some embodiments, the amount of weight assigned to perceived depths is proportional to the number of depths from other sets of data overlapping with it. Some embodiments may merge overlapping depths and establish a new set of depths for the overlapping area with a more accurate ground truth. The mathematical method used can be a moving average or a more complex method.

Due to measurement noise, discrepancies between the value of depths within the area of overlap from the first field of view and the second field of view may exist and the values of the overlapping depths may not be the exact same. In such cases, new depths may be calculated, or some of the depths may be selected as more accurate than others. For example, the overlapping depths from the first field of view and the second field of view (or more fields of view where more images overlap, like more than three, more than five, or more than 10) may be combined using a moving average (or some other measure of central tendency may be applied, like a median or mode) and adopted as the new depths for the area of overlap. The minimum sum of errors may also be used to adjust and calculate new depths for the overlapping area to compensate for the lack of precision between overlapping depths perceived within the first and second fields of view. By way of further example, the minimum mean squared error may be used to provide a more precise estimate of depths within the overlapping area. Other mathematical methods may also be used to further process the depths within the area of overlap, such as split and merge algorithm, incremental algorithm, Hough Transform, line regression, Random Sample Consensus, Expectation-Maximization algorithm, or curve fitting, for example, to estimate more realistic depths given the overlapping depths perceived within the first and second fields of view. The calculated depths are used as the new depths for the overlapping area. In another embodiment, the k-nearest neighbors algorithm can be used where each new depth is calculated as the average of the values of its k-nearest neighbors.

Some embodiments may implement DB-SCAN on depths and related values like pixel intensity, e.g., in a vector space that includes both depths and pixel intensities corresponding to those depths, to determine a plurality of clusters, each corresponding to depth measurements of the same feature of an object. Some embodiments may execute a density-based clustering algorithm, like DBSCAN, to establish groups corresponding to the resulting clusters and exclude outliers. To cluster according to depth vectors and related values like intensity, some embodiments may iterate through each of the depth vectors and designate a depth vectors as a core depth vector if at least a threshold number of the other depth vectors are within a threshold distance in the vector space (which may be higher than three dimensional in cases where pixel intensity is included). Some embodiments may then iterate through each of the core depth vectors and create a graph of reachable depth vectors, where nodes on the graph are identified in response to non-core corresponding depth vectors being within a threshold distance of a core depth vector in the graph, and in response to core depth vectors in the graph being reachable by other core depth vectors in the graph, where to depth vectors are reachable from one another if there is a path from one depth vector to the other depth vector where every link and the path is a core depth vector and is it within a threshold distance of one another. The set of nodes in each resulting graph, in some embodiments, may be designated as a cluster, and points excluded from the graphs may be designated as outliers that do not correspond to clusters.

Some embodiments may then determine the centroid of each cluster in the spatial dimensions of an output depth vector for constructing floor plan maps. In some cases, all neighbors have equal weight and in other cases the weight of each neighbor depends on its distance from the depth considered or (i.e., and/or) similarity of pixel intensity values. In some embodiments, the k-nearest neighbors algorithm is only applied to overlapping depths with discrepancies. In some embodiments, a first set of readings is fixed and used as a reference while the second set of readings, overlapping with the first set of readings, is transformed to match the fixed reference. In one embodiment, the transformed set of readings is combined with the fixed reference and used as the new fixed reference. In another embodiment, only the previous set of readings is used as the fixed reference. Initial estimation of a transformation function to align the newly read data to the fixed reference is iteratively revised in order to produce minimized distances from the newly read data to the fixed reference. The transformation function may be the sum of squared differences between matched pairs from the newly read data and prior readings from the fixed reference. For example, in some embodiments, for each value in the newly read data, the closest value among the readings in the fixed reference is found. In a next step, a point to point distance metric minimization technique is used such that it will best align each value in the new readings to its match found in the prior readings of the fixed reference. One point to point distance metric minimization technique that may be used estimates the combination of rotation and translation using a root mean square. The process is iterated to transform the newly read values using the obtained information. These methods may be used independently or may be combined to improve accuracy. In one embodiment, the adjustment applied to overlapping depths within the area of overlap is applied to other depths beyond the identified area of overlap, where the new depths within the overlapping area are considered ground truth when making the adjustment.

In some embodiments, a modified RANSAC approach is used where any two points, one from each data set, are connected by a line. A boundary is defined with respect to either side of the line. Any points from either data set beyond the boundary are considered outliers and are excluded. The process is repeated using another two points. The process is intended to remove outliers to achieve a higher probability of being the true distance to the perceived wall. Consider an extreme case where a moving object is captured in two frames overlapping with several frames captured without the moving object. The approach described or RANSAC method may be used to reject data points corresponding to the moving object. This method or a RANSAC method may be used independently or combined with other processing methods described above.

In some instances where linear algebra is used, Basic Linear Algebra Subprograms (BLAS) are implemented to carry out operations such as vector addition, vector norms, scalar multiplication, matrix multiplication, matric transpose, matrix-vector multiplication, linear combinations, dot products, cross products, and the like.

In some embodiments, the accuracy of the floor plan is confirmed when the locations at which contact between the robotic device and perimeter coincides with the locations of corresponding perimeters in the floor plan. When the robotic device makes contact with a perimeter it checks the floor plan to ensure that a perimeter is marked at the location at which the contact with the perimeter occurred. Where a boundary is predicted by the map but not detected, corresponding data points on the map may be assigned a lower confidence in the Bayesian approach above, and the area may be re-mapped with the approach above in response. This method may also be used to establish ground truth of Euclidean norms. In some embodiments, a separate map may be used to keep track of the boundary discovered thereby creating another map. Two maps may be merged using different methods, such as the intersection or union of two maps. For example, in some embodiments, the union of two maps may be applied to create an extended map of the working environment with areas which may have been undiscovered in the first map and/or the second map. In some embodiments, a second map may be created on top of a previously created map in a layered fashion, resulting in additional areas of the work space which may have not been recognized in the original map. Such methods may be used, for example, in cases where areas are separated by movable obstacles that may have prevented the robot from determining the full map of the working environment and in some cases, completing an assigned task. For example, a soft curtain may act as a movable object that appears as a wall in a first map. In this case, a second map may be created on top of the previously created first map in a layered fashion to add areas to the original map which may have not been previously discovered. The robot may then recognize (e.g., determine) the area behind the curtain that may be important (e.g., warrant adjusting a route based on) in completing an assigned task.

In one embodiment, construction of the floor plan is complete after the robotic device has made contact with all perimeters and confirmed that the locations at which contact with each perimeter was made coincides with the locations of corresponding perimeters in the floor plan. In some embodiments, a conservative coverage algorithm is executed to cover the internal areas of the floor plan before the robotic device checks if the observed perimeters in the floor plan coincide with the true perimeters of the environment. This ensures more area is covered before the robotic device faces challenging areas such as perimeter points and obstacles.

In some embodiments, all data are processed on the robotic device. In other embodiments, some data are processed on at least one separate device, such as a docking station of the robotic device or on the cloud.

The invention is not to be limited to any type of camera or depth perceiving device or any type of approach or method used for perceiving, measuring or calculating depth, which is not to suggest that any other description herein is limiting. The devices and methods used herein are for illustrative purposes.

Figure 1B:
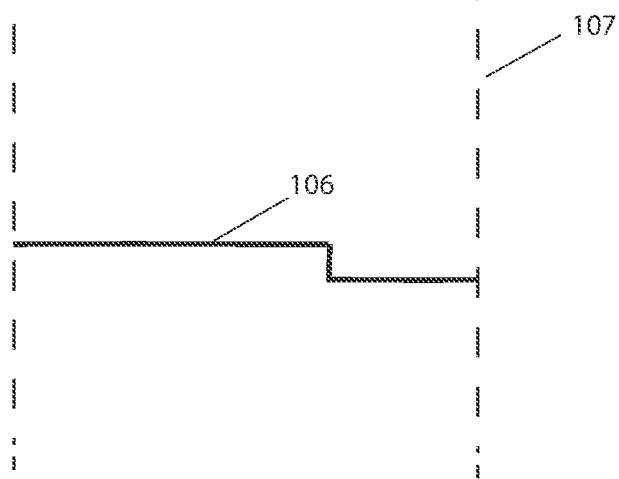
FIG. 1B illustrates a segment of a 2D floor plan constructed from depths perceived within a first field of view.

FIG. 1A illustrates an embodiment of the present invention where camera 100, which may comprise a depth camera or a digital camera combined with an IR illuminator or a camera using natural light for illumination, mounted on robotic device 101 with at least one control system, is perceiving depths 102 at increments 103 within first field of view 104 to object 105, which in this case is a wall. Depths perceived may be in 2D or in 3D. Referring to FIG. 1B, 2D map segment 106 resulting from plotted depth measurements 102 taken within first field of view 104 is illustrated. Dashed lines 107 demonstrate that resulting 2D floor plan segment 104 corresponds to plotted depths 102 taken within field of view 104.

Figure 2A:
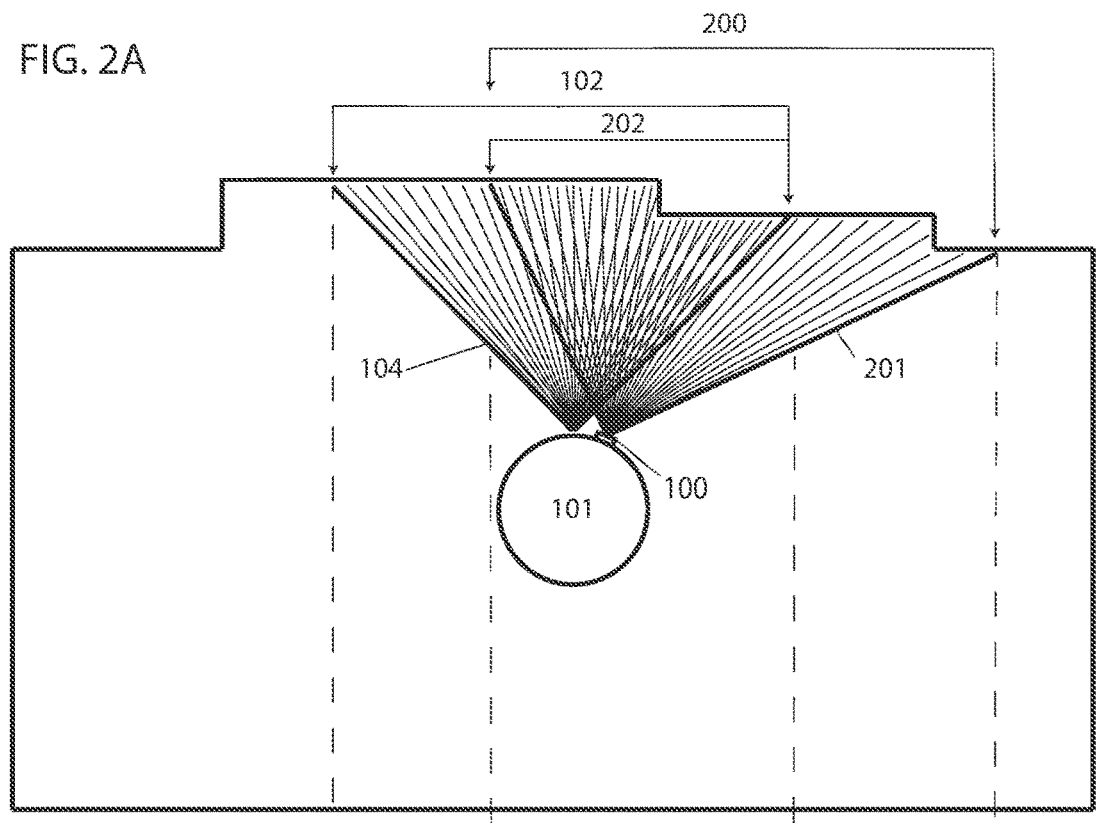
FIG. 2A illustrates depths perceived within a second field of view that partly overlaps a first field of view.

Referring to FIG. 2A, camera 100 mounted on robotic device 101 perceiving depths 200 within second field of view 201 partly overlapping depths 102 within first field of view 104 is illustrated. After depths 102 within first field of view 104 are taken, as shown in FIG. 1A, robotic device 101 with mounted camera 100 rotates to observe second field of view 201 with overlapping depths 202 between first field of view 104 and second field of view 201. In another embodiment, camera 100 rotates independently of robotic device 101. As the robot rotates to observe the second field of view the values of depths 102 within first field of view 104 are adjusted to account for the angular movement of camera 100.

Figure 2B:
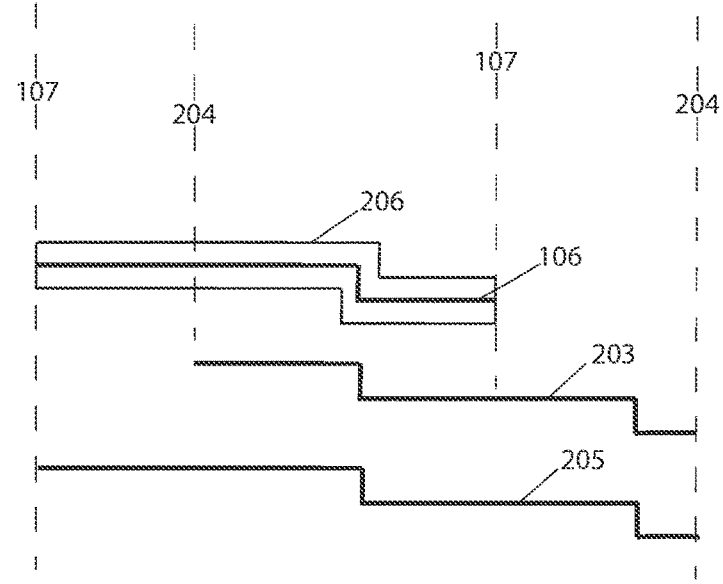
FIG. 2B illustrates how a segment of a 2D floor plan is constructed from depths perceived within two overlapping fields of view.

Referring to FIG. 2B, 2D floor map segments 106 and 203 approximated from plotted depths 102 and 200, respectively, are illustrated. Segments 106 and 200 are bounded by dashed lines 107 and 204, respectively. 2D floor map segment 205 constructed from 2D floor map segments 106 and 203 and bounded by the outermost dashed lines of 107 and 204 is also illustrated. Depths 200 taken within second field of view 201 are compared to depths 102 taken within first field of view 104 to identify the area of overlap bounded by the innermost dashed lines of 204 and 107. An area of overlap is identified when a number of consecutive depths from first field of view 104 and second field of view 201 are similar. In one embodiment, the area of overlap, once identified, may be extended to include a number of depths immediately before and after the identified overlapping area. 2D floor plan segment 106 approximated from plotted depths 102 taken within first field of view 104 and 2D floor plan segment 203 approximated from plotted depths 200 taken within second field of view 201 are combined at the area of overlap to construct 2D floor plan segment 205. In some embodiments, matching patterns in the value of the depths recognized in depths 102 and 200 are used in identifying the area of overlap between the two. For example, the sudden decrease in the value of the depth observed in depths 102 and 200 can be used to estimate the overlap of the two sets of depths perceived. The method of using camera 100 to perceive depths within consecutively overlapping fields of view and the control system to combine them at identified areas of overlap is repeated until all areas of the environment are discovered and a floor plan is constructed. In some embodiments, the constructed floor plan is stored in memory for future use. In other embodiments, a floor plan of the environment is constructed at each use. In some embodiments, once the floor plan is constructed, the robot's control system determines a path for the robot to follow, such as by using the entire constructed map, waypoints, or endpoints, etc.

Figure 3A:
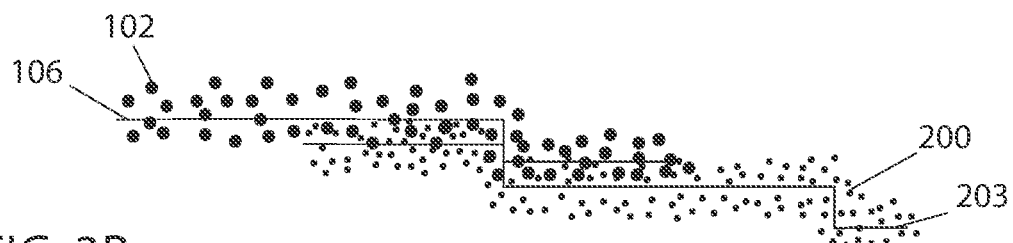
FIG. 3A illustrates overlapping depths from two overlapping fields of view with discrepancies.
Figure 3B:
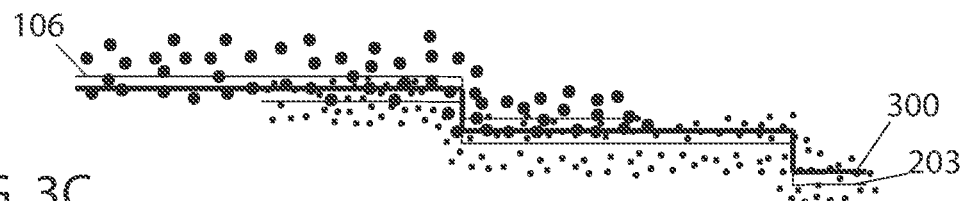
FIG. 3B illustrates overlapping depth from two overlapping fields of view combined using an averaging method.
Figure 3C:
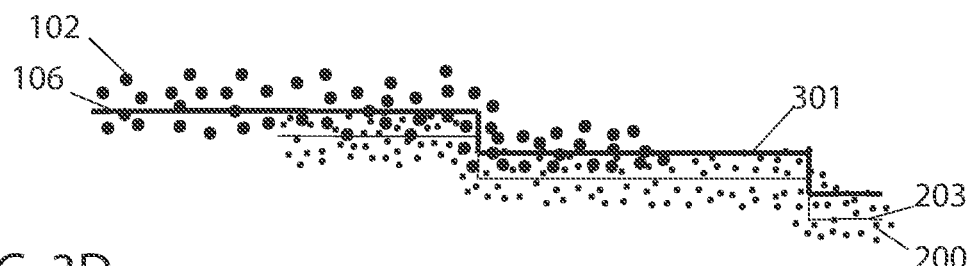
FIG. 3C illustrates overlapping depths from two overlapping fields of view combined using a transformation method.
Figure 3D:
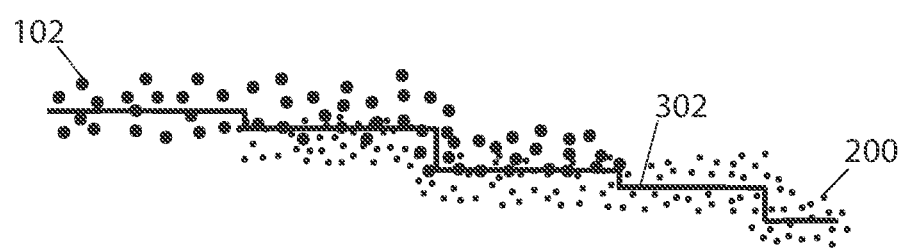
FIG. 3D illustrates overlapping depths from two overlapping fields of view combined using k-nearest neighbor algorithm.

Due to measurement noise, in some embodiments, discrepancies may exist between the value of overlapping depths 102 and 200 resulting in staggered floor plan segments 106 and 203, respectively, shown in FIG. 3A. If there were no discrepancies, segments 106 and 203 would perfectly align. When there are discrepancies, overlapping depths can be averaged and adopted as new depths within the overlapping area, resulting in segment 300 halfway between segment 106 and 203 shown in FIG. 3B. It can be seen that the mathematical adjustment applied to the overlapping depths is applied to depths beyond the area of overlap wherein the new depths for the overlapping area are considered ground truth. In other embodiments, new depths for the area of overlap can be calculated using other mathematical methods, such as the minimum sum of errors, minimum mean squared error, split and merge algorithm, incremental algorithm, Hough Transform, line regression, Random Sample Consensus, Expectation-Maximization algorithm, or curve fitting, for example, given overlapping depths perceived within consecutive fields of view. In another embodiment, plotted depths 102 are fixed and used as a reference while second set of depths 200, overlapping with first set of depths 102, are transformed to match fixed reference 102 such that map segment 203 is aligned as best as possible with segment 106, resulting in segment 301 after combining the two in FIG. 3C. In another embodiment, the k-nearest neighbors algorithm can be used where new depths are calculated from k-nearest neighbors, where k is a specified integer value. FIG. 3D illustrates floor map segment 302 from using k-nearest neighbors approach with overlapping depths 102 and 200.

Figure 4A:
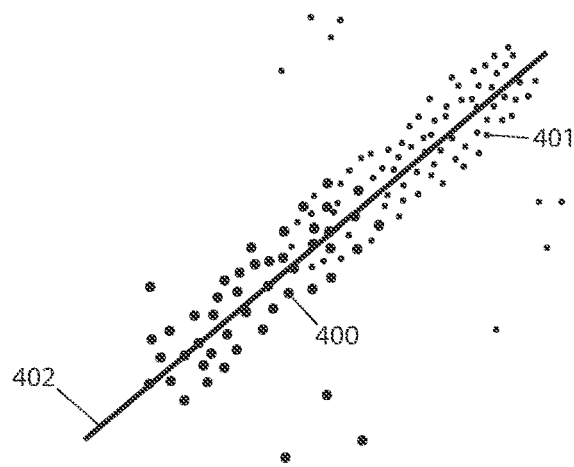
FIG. 4A illustrates aligned overlapping depths from two overlapping fields of view.
Figure 4B:
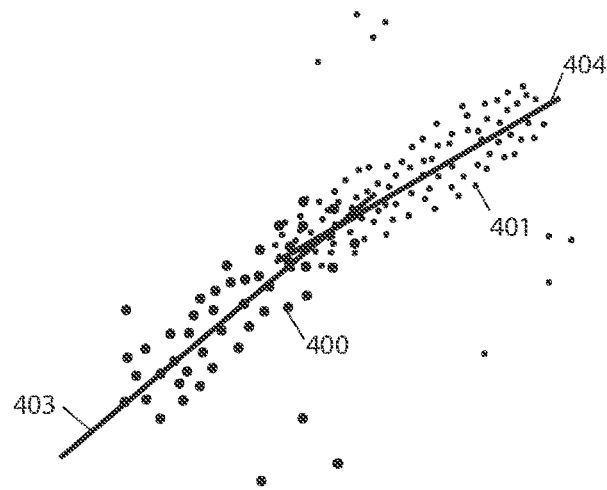
FIG. 4B illustrates misaligned overlapping depths from two overlapping fields of view.
Figure 4C:
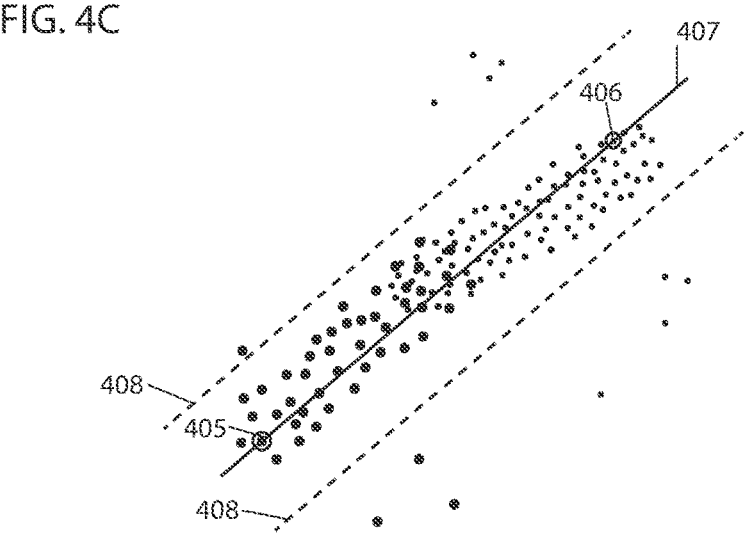
FIG. 4C illustrates a modified RANSAC approach to eliminate outliers.

In some embodiments, a modified RANSAC approach is used to eliminate outliers in the measured data. Consider two overlapping sets of plotted depths 400 and 401 of a wall in FIG. 4A. If overlap between depths 400 and 401 is ideal, the floor map segments used to approximate the wall for both sets of data align, resulting in combined floor map segment 402. However, in certain cases there are discrepancies in overlapping depths 400 and 401, resulting in FIG. 4B where segments 403 and 404 approximating the depth to the same wall do not align. To achieve better alignment of depths 400 and 401, any two points, one from each data set, such as points 405 and 406, are connected by line 407. Boundary 408 is defined with respect to either side of line 407. Any points from either data set beyond the boundary are considered outliers and are excluded. The process is repeated using another two points. The process is intended to remove outliers to achieve a higher probability of determining the true distance to the perceived wall.

In one embodiment, prior to perceiving depths 200 within second field of view 201, adjustment range 206 is determined with respect to depths 102 taken within first field of view 104 to account for expected noise, such as movement noise, as illustrated in FIG. 2B. Adjustment range 206 is the range within which overlapping depths 200 taken within second field of view 201 are expected to fall within and is shown with respect to segment 106 approximated from plotted depths 102.

In yet another embodiment, a weight is assigned to each perceived depth. The value of the weight is determined based on various factors, such as a perceived depth's position with respect to the adjustment range, wherein depths within the adjustment range have a positive effect on the assigned weight. For example, referring to FIG. 2, depths 200 taken within second field of view 201 whose value falls within adjustment range 206 have a more positive effect on the weight than those whose value falls outside adjustment range 206. Other factors may influence the value of the weight of a perceived depth, such as the degree of similarity between overlapping depths from different fields of view, the assigned weight of neighboring depths, wherein neighboring depths with higher assigned weight have a positive effect on the value of the assigned weight of the depth, or the number of neighboring depths with high assigned weight. Depths with an assigned weight less than a predetermined amount are ignored as depths with higher assigned weight are considered to be more accurate. In another embodiment, depths with higher assigned weight are given a more accurate rating. The assigned weight corresponding to each perceived depth can increase or decrease with each set of depths taken within each field of view. Over many fields of view the assigned weight may have increased and decreased.

Figure 5A:
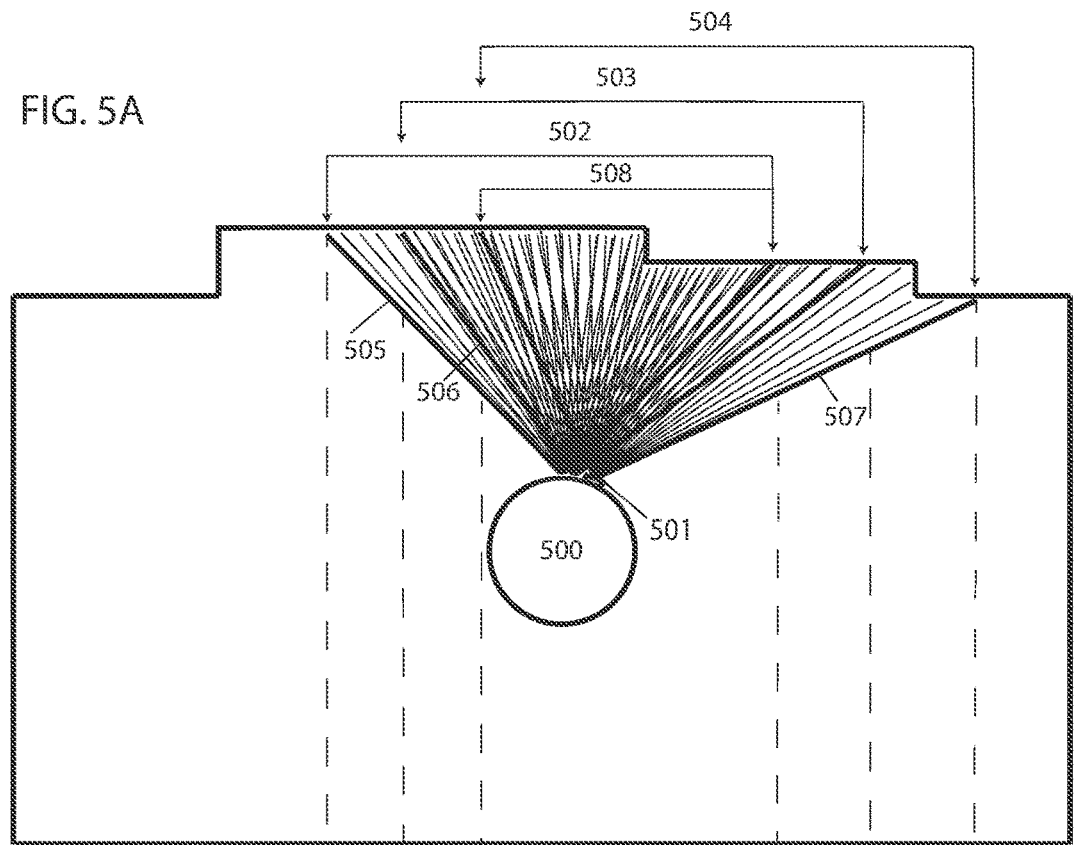
FIG. 5A illustrates depths perceived within three overlapping fields of view.
Figure 5B:
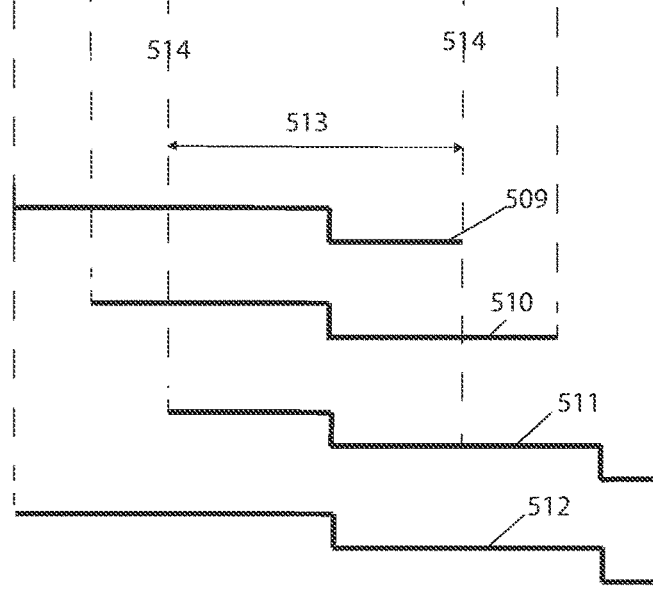
FIG. 5B illustrates a segment of a 2D floor plan constructed from depths perceived within three overlapping fields of view.

In some embodiments, more than two consecutive fields of view overlap resulting in more than two sets of depths falling within an area of overlap. Consider FIG. 5A, wherein robotic device 500 with mounted camera 501 perceives depths 502, 503, and 504 within consecutively overlapping fields of view 505, 506, and 507, respectively. In this case, it can be seen that depths 502, 503, and 504 have overlapping depths 508. Referring to FIG. 5B, floor plan segments 509, 510, and 511 approximated from plotted depths 502, 503, and 504, respectively, are shown. The floor map segments are combined at overlapping areas to construct larger floor map segment 512. In some embodiments, depths falling within overlapping area 513, bound by lines 514, have higher weight than depths beyond overlapping area 513 as three sets of depths overlap within area 513 and increased number of overlapping sets of perceived depths provide a more accurate ground truth. In some embodiments, the weight assigned to depths is proportional to the number of depths from other sets of readings overlapping with it.

Figure 6A:
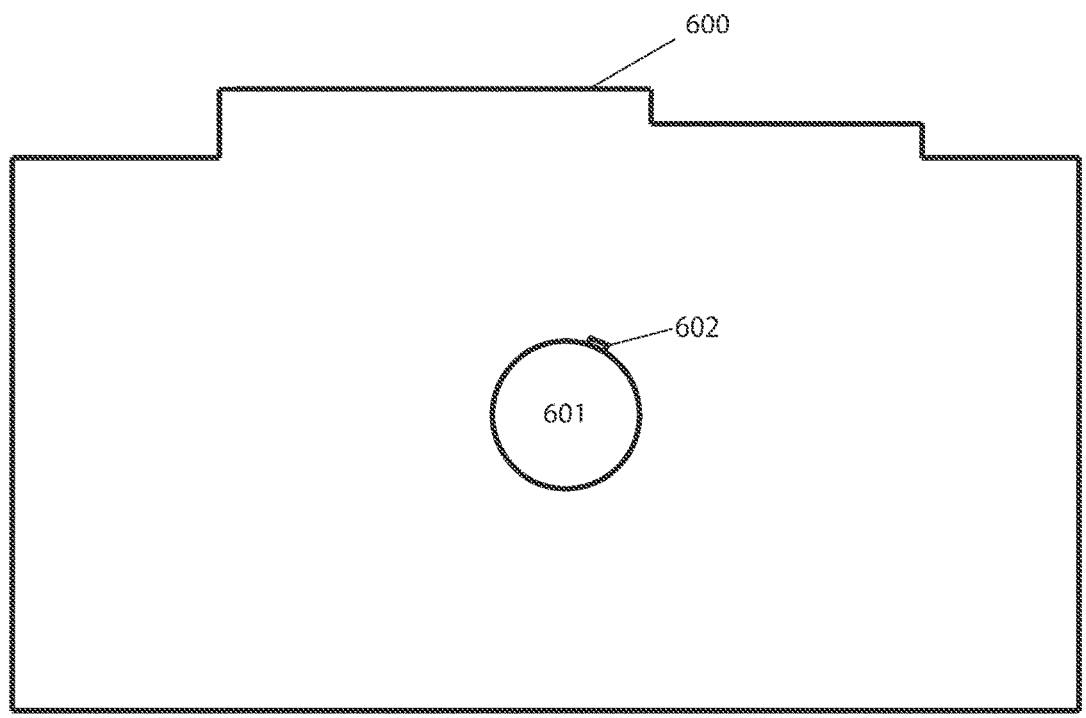
FIG. 6A illustrates a complete 2D floor plan constructed from depths perceived within consecutively overlapping fields of view.
Figure 6B:
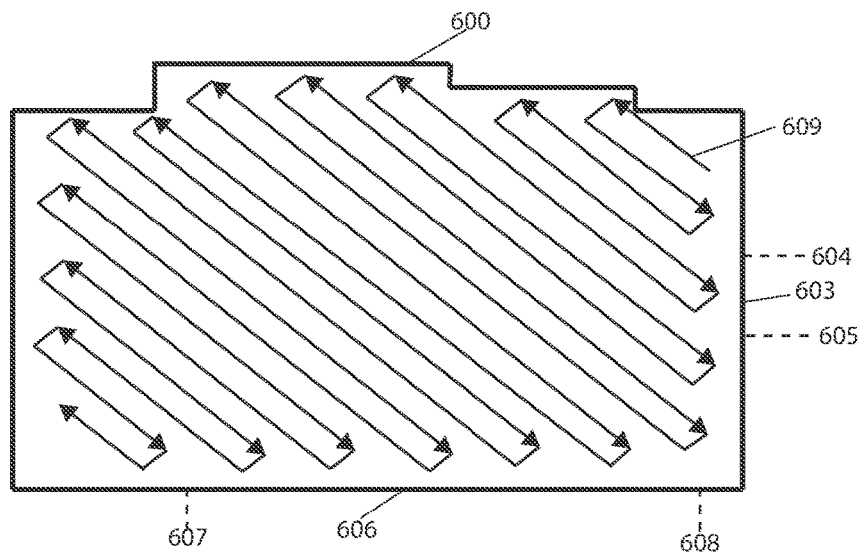
FIGS. 6B and 6C illustrate examples of updated 2D floor plans after discovery of new areas during verification of perimeters.
Figure 6C:
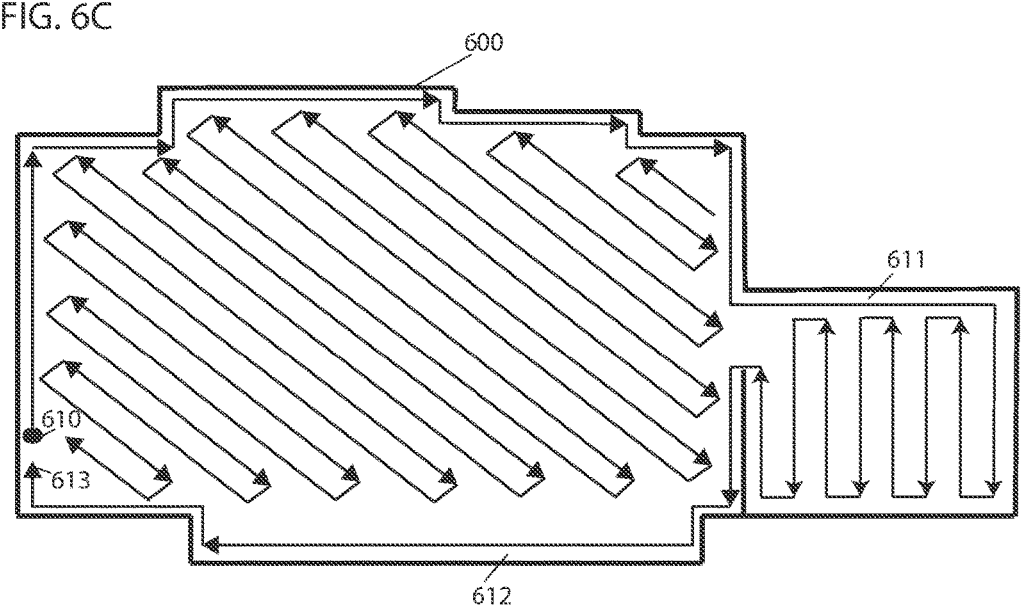

FIG. 6A illustrates an embodiment of the present invention where complete 2D floor plan 600 is constructed using depths perceived in 2D within consecutively overlapping fields of view. In another embodiment, 2D floor plan 600 is constructed using depths perceived in 3D. 2D map 600 can, for example, be used by robotic device 601 with mounted camera 602 to autonomously navigate throughout the working environment during operation wherein the 2D floor plan is constructed by the method described herein prior to carrying out cleaning or other instructions. In one embodiment, the robotic device checks the accuracy of the floor plan by verifying if the locations at which contact between the robotic device and perimeters are observed during, for example, cleaning, coincides with the locations of corresponding perimeters in the floor plan. In some embodiments, construction of the floor plan is complete after the robotic device has made contact with all perimeters of the environment and checked that the locations at which contact with each perimeter was made coincides with the locations of corresponding perimeters in the floor plan. In some embodiments, a conservative coverage algorithm is executed to cover the internal areas of the floor plan before the robotic device checks if the observed perimeters in the floor plan coincide with the true perimeters of the environment. This ensures more area is covered before the robotic device faces challenging areas such as perimeter points and obstacles. For example, in some embodiments, an initial floor plan of the working environment may contain a perimeter in a particular location, which upon verification of the perimeters using a depth sensor may not be found to be in that particular location. In FIG. 6B, for example, initial floor plan 600 comprises perimeter segment 603 extending from dashed line 604 to dashed line 605 and perimeter segment 606 extending from dashed line 607 to 608, among the other segments combined to form the entire perimeter shown. Based on initial floor plan 600 of the working environment, coverage path 609 covering central areas of the environment may be devised and executed for cleaning. Upon completion of coverage path 609, the robotic device may cover the perimeters for cleaning while simultaneously verifying the mapped perimeters using at least one depth sensor of the robotic device, beginning at location 610 in FIG. 6C. As the robot follows along the perimeter, area 611 beyond previously mapped perimeter segment 603 is discovered. This may occur if, for example, a door in the location of perimeter segment 603 was closed during initial mapping of the working environment. Newly discovered area 611 may then be covered by the robotic device as is shown in FIG. 6C, after which the robot may return to following along the perimeter. As the robot continues to follow along the perimeter, area 612 beyond previously mapped perimeter segment 606 is discovered. This may occur if, for example, a soft curtain in the location of perimeter segment 606 is drawn shut during initial mapping of the working environment. Newly discovered area 612 may then be covered by the robotic device as is shown in FIG. 6C, after which the robot may return to following along the perimeter until reaching an end point 613. In some embodiments, the newly discovered areas may be stored in a second floor plan map separate from the initial floor plan map.

Figure 7A:
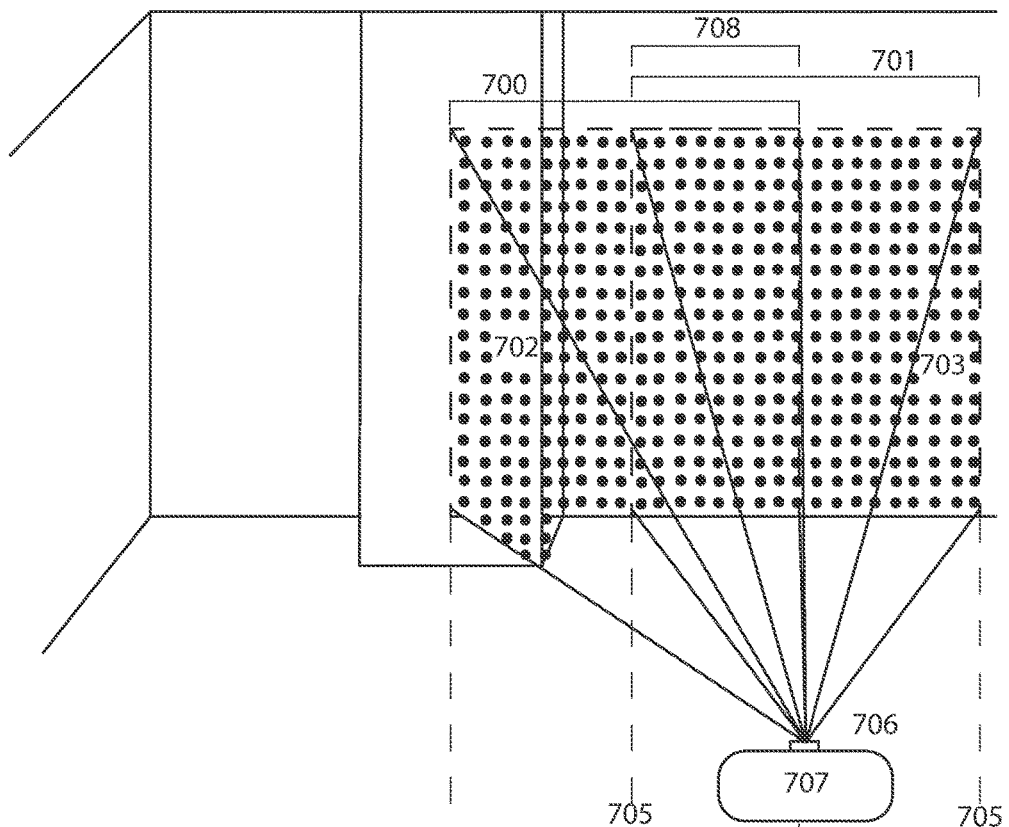
FIG. 7A illustrates depths perceived within two overlapping fields of view.
Figure 7B:
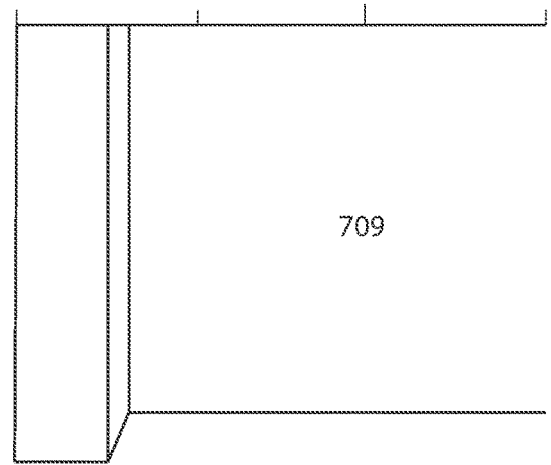
FIG. 7B illustrates a 3D floor plan segment constructed from depths perceived within two overlapping fields of view.

In some embodiments, the method described is used to construct a 3D floor plan of the environment where depth perceived are in 3D. FIG. 7 illustrates the described method applied to the construction of a 3D floor plan. FIG. 7A illustrates 3D depths 700 and 701 taken within consecutively overlapping fields of view 702 and 703 bound by lines 704 and 705, respectively, using 3D depth perceiving device 706 mounted on robotic device 707. FIG. 7B illustrates 3D floor plan segment 708 approximated from the combination of plotted depths 700 and 701 at area of overlap 709 bound by innermost dashed lines 704 and 705. This method is repeated where overlapping depths taken within consecutively overlapping fields of view are combined at the area of overlap to construct a 3D floor plan of the environment.

In one embodiment, the camera used is a 360-degree LIDAR. In this embodiment, the LIDAR is used to take multiple consecutive 360-degree views of the working environment in order to generate an accurate floor plan of the environment.

In some embodiments, more than one depth perceiving device may be used to improve accuracy of the map constructed. For example, a plurality of depth cameras may be used simultaneously where each consecutive depth camera measurement is used to more accurately build a floor plan of the environment. The use of a plurality of depth cameras allows for the collection of depth measurements from different perspectives and angles, for example. Where more than one depth camera is used, triangulation or others suitable methods may be used for further data refinement and accuracy.

The aforementioned camera is not intended to be limited in scope to one particular type of camera nor are any depth cameras mentioned in this application intended to represent a comprehensive list of viable depth cameras for use in this invention. For instance, depth cameras with various fields of view may be used. Such cameras including varying angular resolution, length resolution, grid resolution and the like. In one embodiment, for example, a depth camera may be utilized wherein the angular resolution is 0.1 degree, 1 degree, 3 degrees, or other suitable degree. In another embodiment, the grid resolution could vary, for example, from 0.5 centimeters, to 3 centimeters, to 5 centimeters or to other suitable resolution. In another embodiment, the operating distance of the camera may vary, for example, it could range from 1 centimeter to 8 meters and the like.

The present invention, in some embodiments, affords a method for combining measurements to construct a floor plan of the environment using a depth camera, a digital camera combined with IR point generators, such as an IR LED, or laser line generators, such as an LED with a lens, or using any other type of depth perceiving device. It should be emphasized, though, that embodiments are not limited to techniques that construct a floor plan in this way, as the present techniques may also be used for plane finding in augmented reality, barrier detection in virtual reality applications, outdoor mapping with autonomous drones, and other similar applications. Some embodiments combine depth measurements taken within overlapping fields of view to construct a floor plan (or other map) and are not constrained to a specific type of depth perceiving device for measuring the depths, which again is not to suggest that other descriptions herein are limiting.

Figure 8:
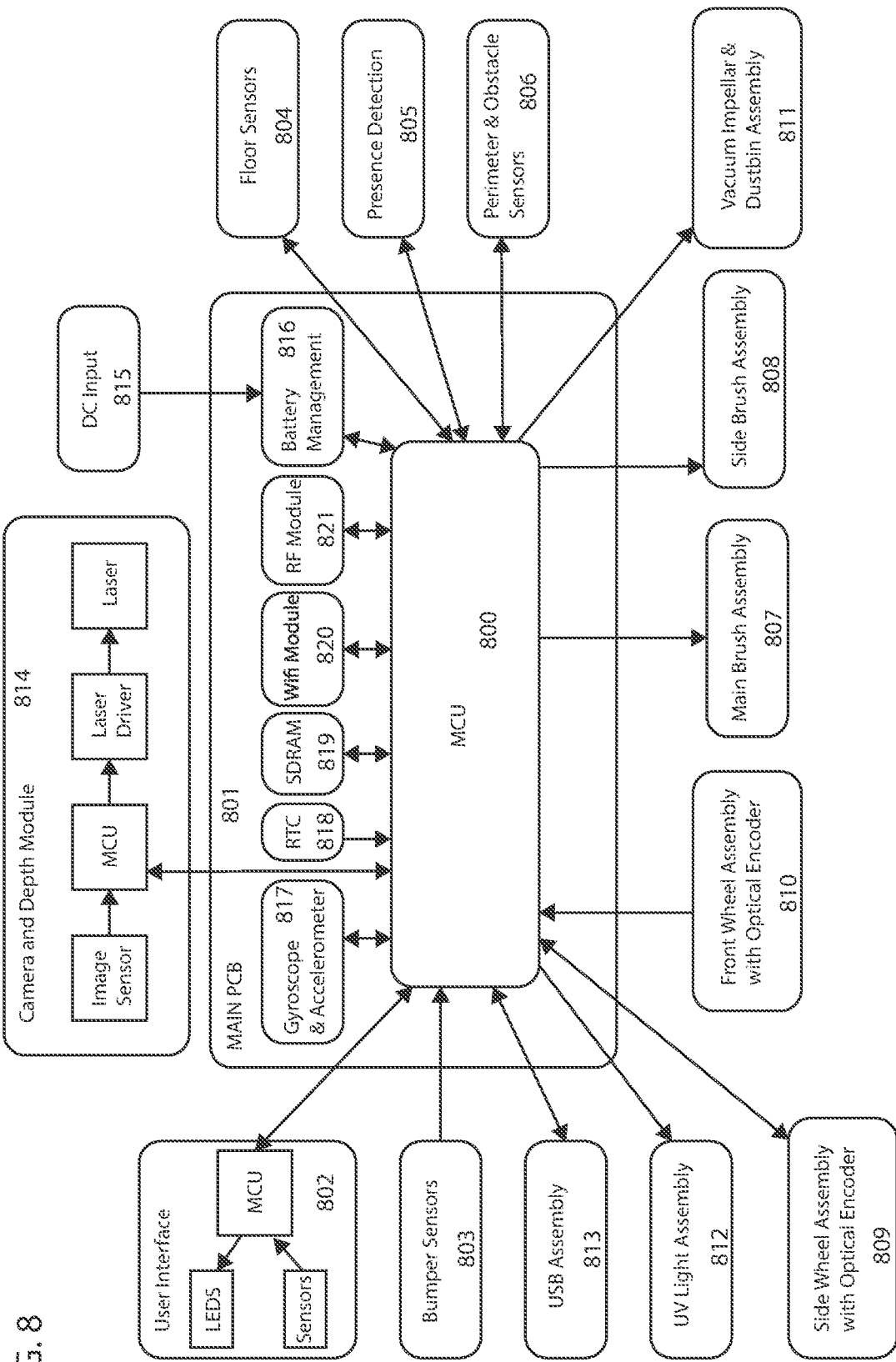
FIG. 8 illustrates an example of a control system and components connected thereto.

FIG. 8 illustrates an example of a control system and components connected thereto. In some embodiments, the control system and related components are part of a robot and carried by the robot as the robot moves. Microcontroller unit (MCU) 800 of main printed circuit board (PCB) 801, or otherwise the control system or processor, has connected to it user interface module 802 to receive and respond to user inputs; bumper sensors 803, floor sensors 804, presence sensors 805 and perimeter and obstacle sensors 806, such as those for detecting physical contacts with objects, edges, docking station, and the wall; main brush assembly motor 807 and side brush assembly motor 808; side wheel assembly 809 and front wheel assembly 810, both with encoders for measuring movement; vacuum impeller motor 811; UV light assembly 812 for disinfection of a floor, for example; USB assembly 813 including those for user programming; camera and depth module 814 for mapping; and power input 815. Included in the main PCB are also battery management 816 for charging; accelerometer and gyroscope 817 for measuring movement; RTC 818 for keeping time; SDRAM 819 for memory; Wi-Fi module 820 for wireless control; and RF module 821 for confinement or communication with docking station. The components shown in FIG. 8 are for illustrative purposes and are not meant to limit the control system and components connected thereto, which is not to suggest that any other description is limiting. Direction of arrows signifies direction of information transfer and is also for illustrative purposes as in other instances direction of information transfer may vary.

Figure 9A:
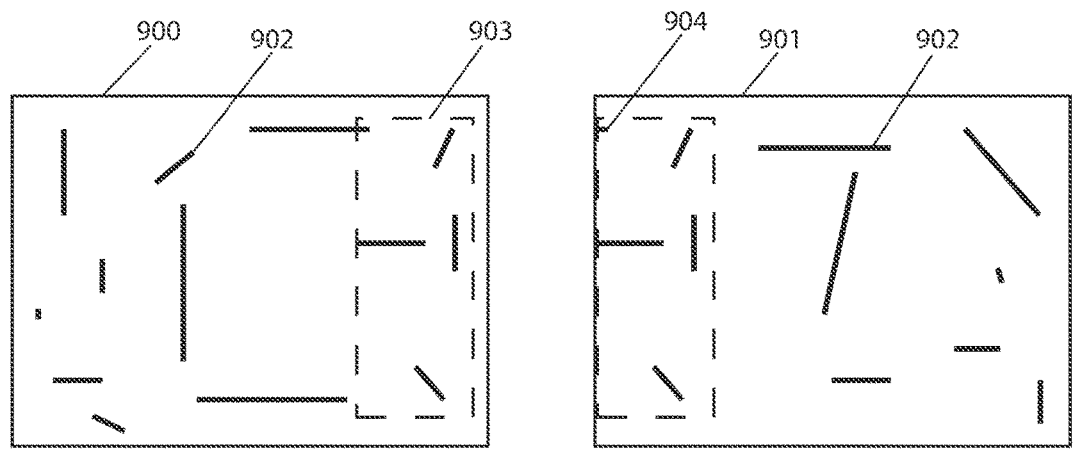
FIGS. 9A-9C illustrate how an overlapping area is detected in some embodiments using raw pixel intensity data and the combination of data at overlapping points.
Figure 9B:
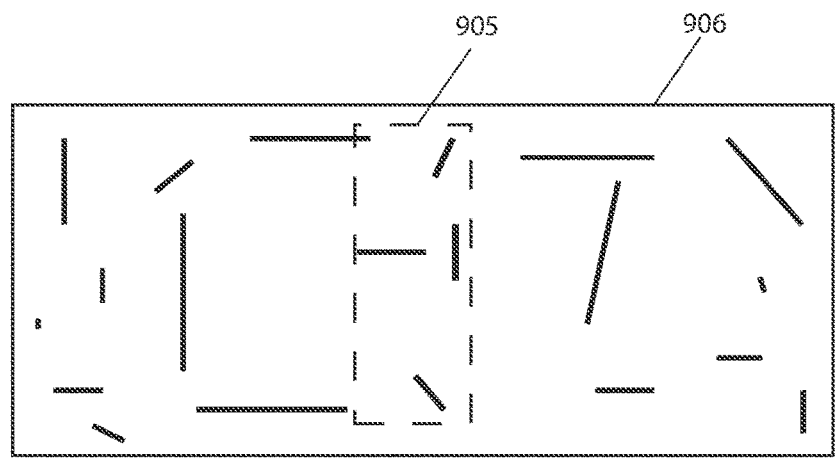
Figure 9C:
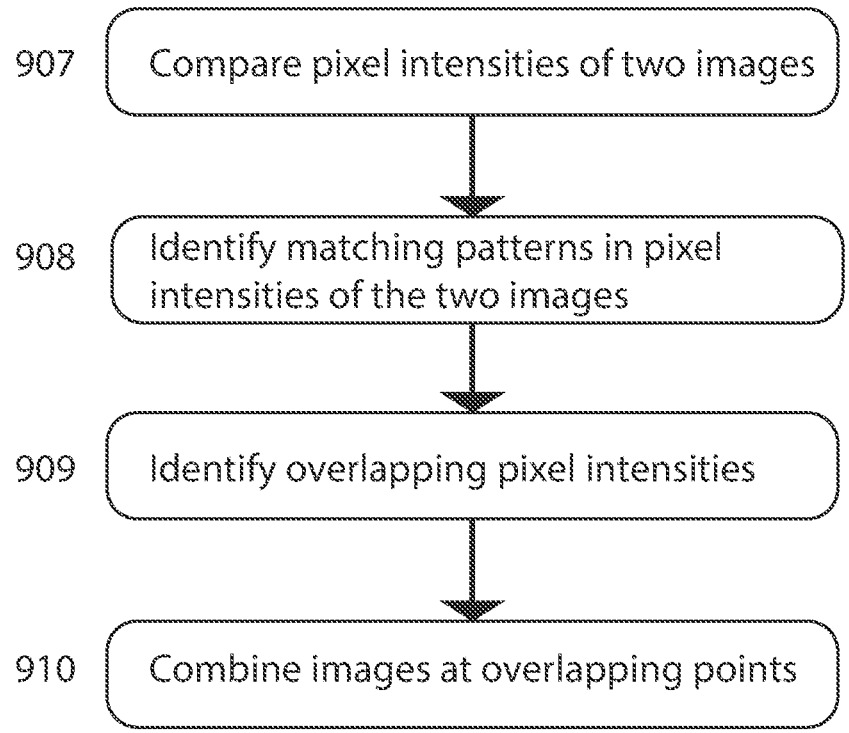

FIGS. 9A and 9B illustrate how overlapping areas using raw pixel intensity data can be detected in some embodiments and the combination of data at overlapping points. In FIG. 9A, the overlapping area between overlapping image 900 captured in a first field of view and image 901 captured in a second field of view may be determined by comparing pixel intensity values of each captured image (or transformation thereof, such as the output of a pipeline that includes normalizing pixel intensities, applying Gaussian blur to reduce the effect of noise, detecting edges in the blurred output (such as Canny or Haar edge detection), and thresholding the output of edge detection algorithms to produce a bitmap like that shown) and identifying matching patterns in the pixel intensity values of the two images, for instance by executing the above-described operations by which some embodiments determine an overlap with a convolution. Lines 902 represent pixels with high pixel intensity value (such as those above a certain threshold) in each image. Area 903 of image 900 and area 904 of image 901 capture the same area of the environment and, as such, the same pattern for pixel intensity values is sensed in area 903 of image 900 and area 904 of image 901. After identifying matching patterns in pixel intensity values in image 900 and 901, an overlapping area between both images may be determined. In FIG. 9B, the images are combined at overlapping area 905 to form a larger image 906 of the environment. In some cases, data corresponding to the images may be combined. For instance, depth values may be aligned based on alignment determined with the image. FIG. 9C illustrates a flowchart describing the process illustrated in FIGS. 9A and 9B wherein a control system of a robotic device at first stage 907 compares pixel intensities of two images captured by a sensor of the robotic device, at second stage 908 identifies matching patterns in pixel intensities of the two images, at third stage 909 identifies overlapping pixel intensities of the two images, and at fourth stage 910 combines the two images at overlapping points.

Figure 10A:
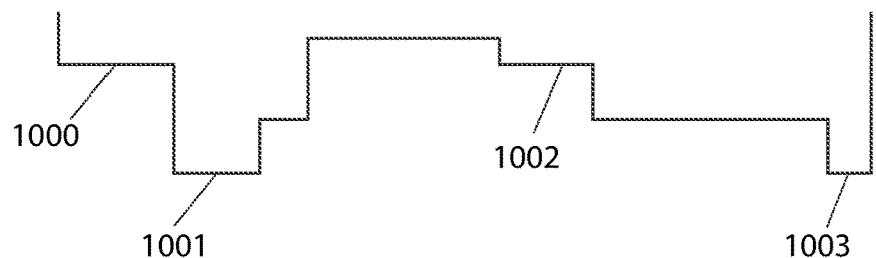
FIGS. 10A-10C illustrate how an overlapping area is detected in some embodiments using raw pixel intensity data and the combination of data at overlapping points.
Figure 10B:
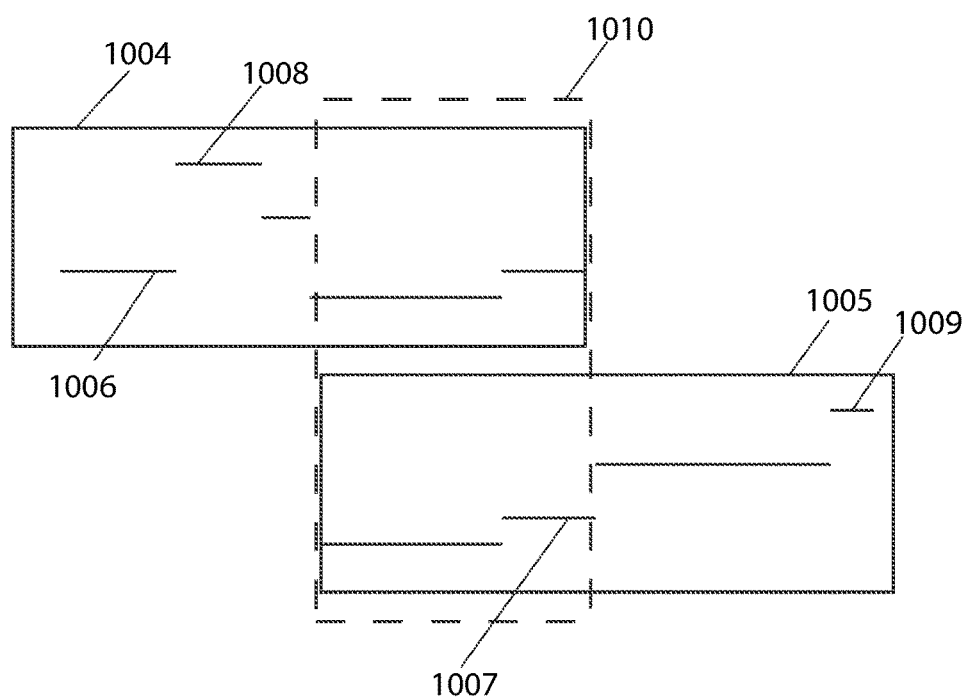
Figure 10C:
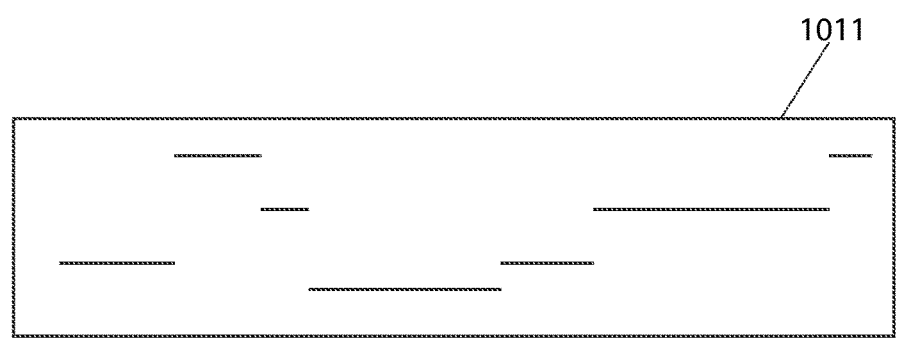

FIGS. 10A-10C illustrate how overlapping areas using raw pixel intensity data can be detected in some embodiments and the combination of data at overlapping points. FIG. 10A illustrates a top (plan) view of an object, such as a wall, with uneven surfaces wherein, for example, surface 1000 is further away from an observer than surface 1001 or surface 1002 is further away from an observer than surface 1003. In some embodiments, at least one infrared line laser positioned at a downward angle relative to a horizontal plane coupled with at least one image sensor may be used to determine the depth of multiple points across the uneven surfaces from captured images of the line laser projected onto the uneven surfaces of the object. Since the line laser is positioned at a downward angle, the position of the line laser in the captured image will appear higher for closer surfaces and will appear lower for further surfaces. Similar approaches may be applied with lasers offset from an image sensor in the horizontal plane. The position of the laser line (or feature of a structured light pattern) in the image may be detected by finding pixels with intensity above a threshold. The position of the line laser in the captured image may be related to a distance from the surface upon which the line laser is projected. In FIG. 10B, captured images 1004 and 1005 of the laser line projected onto the object surface for two different fields of view are shown. Projected laser lines with lower position, such as laser lines 1006 and 1007 in images 1004 and 1005 respectively, correspond to object surfaces 1000 and 1002, respectively, further away from the infrared illuminator and image sensor. Projected laser lines with higher position, such as laser lines 1008 and 1009 in images 1004 and 1005 respectively, correspond to object surfaces 1001 and 1003, respectively, closer to the infrared illuminator and image sensor. Captured images 1004 and 1005 from two different fields of view may be combined into a larger image of the environment by finding an overlapping area between the two images and stitching them together at overlapping points. The overlapping area may be found by identifying similar arrangement of pixel intensities in both images, wherein pixels with high intensity may be the laser line. For example, areas of images 1004 and 1005 bound within dashed lines 1010 have similar arrangement of pixel intensities as both images captured a same portion of the object within their field of view. Therefore, images 1004 and 1005 may be combined at overlapping points to construct larger image 1011 of the environment shown in FIG. 10C. The position of the laser lines in image 1101, indicated by pixels with intensity value above a threshold intensity, may be used to infer depth of surfaces of objects from the infrared illuminator and image sensor (see, U.S. patent application Ser. No. 15/674,310, which is hereby incorporated by reference).

In block diagrams provided herein, illustrated components are depicted as discrete functional blocks, but embodiments are not limited to systems in which the functionality described herein is organized as illustrated. The functionality provided by each of the components may be provided by software or hardware modules that are differently organized than is presently depicted. For example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, the applicant has grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships (e.g., "in response to X, Y," "upon X, Y,", "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus specially designed to carry out the stated functionality, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct (e.g., reference to "parallel" surfaces encompasses substantially parallel surfaces). The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. Negative inferences should not be taken from inconsistent use of "(s)" when qualifying items as possibly plural, and items without this designation may also be plural.

The present techniques will be better understood with reference to the following enumerated embodiments:

1. A method of perceiving a spatial model of a working environment, the method comprising: capturing data by one or more sensors of a robot moving within a working environment, the data being indicative of depth to surfaces in the working environment from respective sensors of the robot at a plurality of different sensor poses within the working environment; obtaining, with one or more processors of the robot, a plurality of depth images based on the captured data, wherein: respective depth images are based on data captured from different positions within the working environment through which the robot moves, respective depth images comprise a plurality of depth data, the depth data indicating distance from respective sensors to objects within the working environment at respective sensor poses, and depth data of respective depth images correspond to respective fields of view; aligning, with one or more processors of the robot, depth data of respective depth images based on an area of overlap between the fields of view of the plurality of depth images; and determining, with one or more processors of the robot, based on alignment of the depth data, a spatial model of the working environment.
2. The method of embodiment 1, comprising: storing at least part of the spatial model of the working environment in memory of the robot; determining, with one or more processors of the robot, a path of the robot based on the at least part of the spatial model of the working environment; and controlling, with one or more processors of the robot, an actuator of the robot to cause the robot to move along the determined path.
3. The method of any one of embodiments 1-2, wherein: depth data is associated with respective values indicating respective angular displacements of corresponding depths in respective frames of reference corresponding to respective fields of view; the depth images are obtained by: processing captured stereoscopic pairs of two-dimensional optical images from two different sensor poses and inferring respective depth images from parallax of features in respective pairs of two-dimensional images; obtaining captured time of flight readings from a depth sensor based on light or ultrasonic signals transmitted from the robot and reflected back to the robot by sensed objects in the working environment; or triangulating object depths based on captured angles at which a laser emitted from the robot and reflecting off respective objects is received at a camera sensor of the robot; the plurality of depth data comprises a plurality of depth vectors from the sensor to objects within the working environment, respective vectors including at least one coordinate indicating relative position in a respective field of view and at least one coordinate indicating depth; and at least some of the fields of view partly overlap with a respective preceding field of view
4. The method of any one of embodiments 1-3, wherein the one or more sensors comprise at least one imaging sensor and at least one infrared illuminator.
5. The method of any one of embodiments 1-4, wherein aligning comprises: determining a first area of overlap between a first depth image and a second depth image among the plurality of depth images; and determining a second area of overlap between the second depth image and a third depth image among the plurality of depth images, the first area of overlap being at least partially different from the second area of overlap.
6. The method of embodiment 5, wherein determining the first area of overlap comprises: determining the first area of overlap based on a Jacobian matrix; and determining the first area of overlap based on a Hessian matrix.
7. The method of any one of embodiments 5-6, wherein determining the first area of overlap comprises: detecting a first edge at a first position in the first image based on a derivative of depth with respect to one or more spatial coordinates of depth data in the first depth image; detecting a second edge at a second position in the first image based on the derivative of depth with respect to one or more spatial coordinates of depth data in the first depth image; detecting a third edge in a third position in the second image based on a derivative of depth with respect to one or more spatial coordinates of depth data in the second depth image; determining that the third edge is not the same edge as the second edge based on shapes of the third edge and the second edge not matching; determining that the third edge is the same edge as the first edge based on shapes of the first edge and the third edge at least partially matching; and determining the first area of overlap based on a difference between the first position and the third position.
8. The method of any one of embodiments 5-7, wherein determining the first area of overlap comprises: thresholding the first depth image to form a first thresholded depth image; thresholding the second depth image to form a second thresholded depth image; and aligning the first thresholded depth image to the second thresholded depth image.
9. The method of any one of embodiments 5-8, wherein determining the first area of overlap comprises: determining alignment scores of a plurality of candidate alignments based on a Szymkiewicz-Simpson coefficient of overlap between at least part of the first depth image and at least part of the second depth image; and selecting an alignment from among the candidate alignments based on the alignment scores.
10. The method of any one of embodiments 5-9, wherein determining the first area of overlap comprises: determining an approximate alignment between a reduced resolution version of the first depth image and a reduced resolution version of the second depth image; and refining the approximate alignment by: determining aggregate amounts of difference between overlapping portions of the first depth image and the second depth image at candidate alignments displaced from the approximate alignment; and selecting a candidate alignment that produces a lowest aggregate amount of difference among the candidate alignments or selecting a candidate alignment that produces an aggregate amount of difference less than a threshold.

11. The method of any one of embodiments 5-10, wherein determining the first area of overlap comprises: detecting a feature in the first depth image; detecting the feature in the second depth image; determining a first value indicative of a difference in position of the feature in the first and second depth images in a first frame of reference of the one or more sensors; obtaining a second value indicative of a difference in pose of the one or more sensors between when depth data from which the first depth image is obtained and when depth data from which the second depth image is obtained; and determining the first area of overlap based on the first value and the second value.

12. The method of any one of embodiments 5-11, wherein determining the first area of overlap comprises: applying a convolution to the first depth image with a kernel function that determines aggregate measures of difference between at least part of the first depth image and at least part of the second depth image based on differences between depths in respective images; and selecting an alignment that the convolution indicates has a smallest aggregate measure of difference.

13. The method of any one of embodiments 1-12, wherein determining the first area of overlap comprises: obtaining a vector indicative of spatial displacement of the one or more sensors between the first image and the second image in a frame of reference of the working environment; and transforming frames of reference of the second depth image and the first depth image into the same frame of reference based on the vector.

14. The method of any one of embodiments 5-13, wherein determining the spatial model of the working environment comprises: determining a point cloud model of the working environment based on alignment of the plurality of depth images.

15. The method of any one of embodiments 5-14, wherein determining the spatial model of the working environment comprises: determining a two-dimensional bitmap representation of obstacles in the working environment based on alignment of the plurality of depth images.

16. The method of any one of embodiments 5-15, wherein determining the spatial model of the working environment comprises: updating priors of a Bayesian spatial model of the working environment from a previous mapping by the robot.

17. The method of any one of embodiments 5-16, comprising: simultaneously localizing the robot and mapping the working environment, wherein the spatial model comprises positions of obstacles in the working environment and values indicating confidence scores for those respective positions, wherein: the confidence scores are based on at least one of the following: quality of the captured data, noise in perceived depth, similarity between depths recorded from different fields of view, or confident scores of adjacent depths; and determining the spatial model comprises pruning or determining to not add positions of obstacles with a threshold confidence score that fails to satisfy a threshold from, or to, the spatial model.

18. The method of any one of embodiments 1-17, comprising: steps for constructing a floor plan of the working environment.

19. The method of any one of embodiments 1-18, comprising: cleaning a floor based on at least part of the spatial model with the robot.

20. A robot, comprising: an actuator configured to move a robot through a working environment; one or more sensors mechanically coupled to the robot; one or more processors configured to receive sensed data from the one or more sensors and control the actuator; and memory storing instructions that when executed by at least some of the processors effectuate operations comprising: the operations of any one of embodiments 1-21. A method for constructing a floor plan using at least one camera, the method comprising: perceiving depths from the at least one camera to objects within a first field of view, such that a depth is recorded for specified angles within the first field of view; moving the at least one camera; perceiving depths from the at least one camera to objects within a second field of view, such that a depth is recorded for specified angles within the second field of view; comparing, with one or more processors, depths from the first field of view to depths from the second field of view identifying, with one or more processors, an area of overlap between the depths from the first field of view and the second field of view when a number of consecutive depths from the first field of view and second field of view are similar to a specified tolerance range; and combining depths from the first field of view with depths from the second field of view at the identified area of overlap to generate combined fields of view.

22. The method in embodiment 21, wherein: the combined fields of view represent a portion of the floor plan; steps of the method are repeated such that the objects within a working environment are plotted by the combination of depths from consecutively overlapping fields of view; and moving the at least one camera comprises moving the at least one camera such that consecutive fields of view overlap.

23. The method of any one of embodiments 21-22, further comprising calculating an adjustment range based on expected noise, wherein: the adjustment range is applied with respect to depths from the first field of view; the adjustment range comprises a range within which overlapping depths from the second field of view are expected to fall.

24. The method of any one of embodiments 21-23, further comprising assigning a weight to each depth based on accuracy of the depth, wherein a depth falling within the adjustment range increases the weight and a depth falling outside the adjustment range decreases the weight or vice versa and depths with higher weight are assigned a more accurate rating or vice versa.

25. The method of embodiment 24, wherein: similarities between depths recorded from separate fields of view affect the weight of the depth; the weight of a respective depth is affected by the weight of other depths within a threshold depth of the respective depth; the weight corresponding to a depth changes with each depth taken within each field of view; the weight of the depths within an area of overlap increases with increasing area of overlap; where the weight of depths increases with the number of sets of depths overlapping with the depths; and depths with weight less than a threshold amount are excluded from at least some operations.

26. The method of embodiment 24, wherein: similarities between depths recorded from separate fields of view affect the weight of the depth; the weight of a respective depth is affected by the weight of other depths within a threshold depth of the respective depth; the weight corresponding to a depth changes with each depth taken within each field of view; the weight of the depths within an area of overlap increases with increasing area of overlap; where the weight of depths increases with the number of sets of depths overlapping with the depths; or depths with weight less than a threshold amount are excluded from at least some operations.

27. The method of any one of embodiments 21-26, wherein the overlapping area is expanded relative to an initially determined overlapping area to include depths taken before and after the identified overlapping area.

28. The method of any one of embodiments 21-26, wherein: combining depths from the first field of view with depths from the second field of view at the identified area of overlap further comprises estimating depths for the area of overlap; and depths from the area of overlap are estimated using the overlapping depths taken from the first field of view and the second field of view and a mathematical model.

29. The method of any one of embodiments 21-28, wherein the at least one camera comprises a depth camera.

30. The method of any one of embodiments 21-29, wherein the at least one camera comprises a 360-degree LIDAR (light detection and ranging) system.

31. The method of any one of embodiments 21-30, wherein the at least one camera comprises a digital camera positioned at an angle with respect to a horizontal plane combined with at least one infrared illuminator configured to project light onto objects.

32. The method of any one of embodiments 21-31, further comprising: storing at least part of the floor plan in memory; and generating at least part of a new floor plan at each startup.

33. An apparatus that generates a floor plan of an environment comprising: at least one camera mounted on and coupled to a robotic device; and at least one control system coupled to the robotic device, wherein: the at least one camera is configured to perceive depths to objects within a first field of view and the control system is configured to record a depth for every specified angle within the first field of view, the at least one camera is configured to move, the at least one camera is configured to perceive depths to objects within a second field of view and the control system is configured to record a depth for every specified angle within the second field of view, the control system is configured to compare depths from the first field of view to depths taken from the second field of view, the control system is configured to identify an area of overlap between depths from the first field of view and the second field of view when a number of consecutive depths from the first field of view and second field of view are similar to a specified tolerance range; and the control system is configured to combine the first field of view and the second field of view at the identified area of overlap.

34. The apparatus of embodiment 33, wherein the combined fields of view represent a portion of the floor plan.

35. The apparatus of any one of embodiments 33-34, wherein the camera is configured to repeatedly perceive depths within consecutively overlapping fields of view and the control system combines overlapping depths to plot objects within a working environment.

36. The apparatus of any one of embodiments 33-35, wherein the at least one camera comprises a 360-degree LIDAR system.

37. The apparatus of any one of embodiments 33-36, wherein the at least one camera has at least one degree of freedom of movement relative to the robotic device.

38. The apparatus of any one of embodiments 33-37, wherein: the constructed floor plan comprises a 2D floor plan constructed from 2D depths; the constructed floor plan comprises a 2D map constructed from 3D depths; or the constructed floor plan comprises a 3D map constructed from 3D depths.

39. The apparatus of any one of embodiments 33-38, wherein the control system is configured to determine accuracy of the floor plan by comparing locations at which contact between the robotic device and perimeters occur with the locations of corresponding perimeters on the floor plan.

40. The apparatus of any one of embodiments 33-39, wherein the control system is configured to complete construction of the floor plan after the robotic device has made contact with all perimeters and confirmed that the locations at which contact with each perimeter was made coincides with the locations of corresponding perimeters in the floor plan.

We claim:

1. A method of perceiving a spatial model of a working environment, the method comprising:
    capturing data by one or more sensors of a robot moving within a working environment, the data being indicative of depth within the working environment from respective sensors of the robot to objects in the working environment at a plurality of different sensor poses;
    obtaining, with one or more processors of the robot, a plurality of depth images based on the captured data, wherein:
        respective depth images are based on data captured from different positions within the working environment through which the robot moves,
        respective depth images comprise a plurality of depth data, the depth data indicating distance from respective sensors to objects within the working environment at respective sensor poses, and
        depth data of respective depth images correspond to respective fields of view;
    aligning, with one or more processors of the robot, depth data of respective depth images based on an area of overlap between the fields of view of the plurality of depth images, wherein aligning comprises:
        determining a first area of overlap between a first depth image and a second depth image among the plurality of depth images by:
            detecting a feature in the first depth image;
            detecting the feature in the second depth image;
            determining a first value indicative of a difference in position of the feature in the first and second depth images in a first frame of reference of the one or more sensors;
            obtaining a second value indicative of a difference in pose of the one or more sensors between when depth data from which the first depth image is obtained and when depth data from which the second depth image is obtained; and
            determining the first area of overlap based on the first value and the second value; and
        determining a second area of overlap between the second depth image and a third depth image among the plurality of depth images, the first area of overlap being at least partially different from the second area of overlap; and determining, with one or more processors of the robot, based on alignment of the depth data, a spatial model of the working environment, wherein at least some data processing of the spatial model is offloaded from the robotic device to the cloud, wherein the spatial model is further processed to identify rooms in a floor plan, and wherein the spatial model is stored in memory accessible to the robot during a subsequent operational session for use in autonomously navigating the working environment.

2. The method of claim 1, comprising:

storing at least part of the spatial model of the working environment in memory of the robot;

determining, with one or more processors of the robot, a path of the robot based on the at least part of the spatial model of the working environment; and controlling, with one or more processors of the robot, an actuator of the robot to cause the robot to move along the determined path.

3. The method of claim 1, wherein:

depth data is associated with respective values indicating respective angular displacements of corresponding depths in respective frames of reference corresponding to respective fields of view;

the depth images are obtained by triangulating object depths based on captured angles at which a laser emitted from the robot and reflecting off respective objects is received at a camera sensor of the robot;

the plurality of depth data comprises a plurality of depth vectors from the sensor to objects within the working environment, respective vectors including at least one coordinate indicating relative position in a respective field of view and at least one coordinate indicating depth; and at least some of the fields of view partly overlap with a respective preceding field of view.

4. The method of claim 1, wherein the one or more sensors comprise at least one imaging sensor and at least one infrared illuminator.

5. The method of claim 1, wherein determining at least one of the first area of overlap and the second area of overlap comprises:

determining the first area of overlap based on Jacobian and Hessian matrices.

6. The method of claim 1, wherein determining the first area of overlap comprises:

detecting a first edge at a first position in the first image based on a derivative of depth with respect to one or more spatial coordinates of depth data in the first depth image;

detecting a second edge at a second position in the first image based on the derivative of depth with respect to one or more spatial coordinates of depth data in the first depth image;

detecting a third edge in a third position in the second image based on a derivative of depth with respect to one or more spatial coordinates of depth data in the second depth image;

determining that the third edge is not the same edge as the second edge based on shapes of the third edge and the second edge not matching;

determining that the third edge is the same edge as the first edge based on shapes of the first edge and the third edge at least partially matching; and determining the first area of overlap based on a difference between the first position and the third position.

7. The method of claim 1, wherein determining the first area of overlap comprises:

thresholding the first depth image to form a first thresholded depth image;

thresholding the second depth image to form a second thresholded depth image; and aligning the first thresholded depth image to the second thresholded depth image.

8. The method of claim 1, wherein determining the first area of overlap comprises:

determining alignment scores of a plurality of candidate alignments based on a Szymkiewicz-Simpson coefficient of overlap between at least part of the first depth image and at least part of the second depth image; and selecting an alignment from among the candidate alignments based on the alignment scores.

9. The method of claim 1, wherein determining the first area of overlap comprises:

determining an approximate alignment between a reduced resolution version of the first depth image and a reduced resolution version of the second depth image; and refining the approximate alignment by:

determining aggregate amounts of difference between overlapping portions of the first depth image and the second depth image at candidate alignments displaced from the approximate alignment; and selecting a candidate alignment that produces a lowest aggregate amount of difference among the candidate alignments or selecting a candidate alignment that produces an aggregate amount of difference less than a threshold.

10. The method of claim 1, wherein determining the first area of overlap comprises:

applying a convolution to the first depth image with a kernel function that determines aggregate measures of difference between at least part of the first depth image and at least part of the second depth image based on differences between depths in respective images; and selecting an alignment that the convolution indicates has a smallest aggregate measure of difference.

11. The method of claim 1, wherein determining the first area of overlap comprises:

obtaining a vector indicative of spatial displacement of the one or more sensors between the first image and the second image in a frame of reference of the working environment; and transforming frames of reference of the second depth image and the first depth image into the same frame of reference based on the vector.

12. The method of claim 1, wherein determining the spatial model of the working environment comprises:

determining a point cloud model of the working environment based on alignment of the plurality of depth images.

13. The method of claim 1, wherein determining the spatial model of the working environment comprises:

determining a two-dimensional bitmap representation of obstacles in the working environment based on alignment of the plurality of depth images.

14. The method of claim 1, wherein determining the spatial model of the working environment comprises:

updating priors of a Bayesian spatial model of the working environment from a previous mapping by the robot.

15. The method of claim 1, comprising:
simultaneously localizing the robot and mapping the working environment, wherein the spatial model comprises positions of obstacles in the working environment and values indicating confidence scores for those respective positions, wherein:
the confidence scores are based on at least one of the following:
quality of the captured data,
noise in perceived depth,
similarity between depths recorded from different fields of view, or
confident scores of adjacent depths; and
determining the spatial model comprises pruning or determining to not add positions of obstacles with a threshold confidence score that fail to satisfy a threshold from, or to, the spatial model.

16. The method of claim 1, comprising:
steps for constructing at least one floor plan of the working environment.

17. The method of claim 1, comprising:
cleaning a floor with the robot based on at least part of the spatial model.

18. A robot, comprising:
an actuator configured to move a robot through a working environment;
one or more sensors mechanically coupled to the robot;
one or more processors configured to receive sensed data from the one or more sensors and control the actuator; and
memory storing instructions that when executed by at least some of the processors effectuate operations comprising:
capturing data by one or more sensors of a robot moving within the working environment, the data being indicative of depth within the working environment from respective sensors of the robot to objects in the working environment at a plurality of different sensor poses;
obtaining a plurality of depth images based on the captured data, wherein:
respective depth images are based on data captured from different positions within the working environment through which the robot moves,
respective depth images comprise a plurality of depth data, the depth data indicating distance from respective sensors to objects within the working environment at respective sensor poses, and
depth data of respective depth images correspond to respective fields of view;
aligning depth data of respective depth images based on an area of overlap between the fields of view of the plurality of depth images, wherein aligning comprises:
determining a first area of overlap between a first depth image and a second depth image among the plurality of depth images by:
detecting a feature in the first depth image;
detecting the feature in the second depth image;
determining a first value indicative of a difference in position of the feature in the first and second depth images in a first frame of reference of the one or more sensors;
obtaining a second value indicative of a difference in pose of the one or more sensors between when depth data from which the first depth image is obtained and when depth data from which the second depth image is obtained; and
determining the first area of overlap based on the first value and the second value; and
determining a second area of overlap between the second depth image and a third depth image among the plurality of depth images, the first area of overlap being at least partially different from the second area of overlap; and
determining, based on alignment of the depth data, a spatial model of the working environment,
wherein at least some data processing of the spatial model is offloaded from the robotic device to the cloud,
wherein the spatial model is further processed to identify rooms in a floor plan, and
wherein the spatial model is stored in memory accessible to the robot during a subsequent operational session for use in autonomously navigating the working environment.

19. The robot of claim 18, wherein the operations comprise:
storing at least part of the spatial model of the working environment in memory of the robot;
determining, with one or more processors of the robot, a path of the robot based on the at least part of the spatial model of the working environment; and
controlling, with one or more processors of the robot, an actuator of the robot to cause the robot to move along the determined path.

20. The robot of claim 18, wherein:
depth data is associated with respective values indicating respective angular displacements of corresponding depths in respective frames of reference corresponding to respective fields of view;
the depth images are obtained by triangulating object depths based on captured angles at which a laser emitted from the robot and reflecting off respective objects is received at a camera sensor of the robot;
the plurality of depth data comprises a plurality of depth vectors from the sensor to objects within the working environment, respective vectors including at least one coordinate indicating relative position in a respective field of view and at least one coordinate indicating depth; and
at least some of the fields of view partly overlap with a respective preceding field of view.

21. The robot of claim 18, wherein the one or more sensors comprise at least one imaging sensor and at least one infrared illuminator.

22. The robot of claim 18, wherein determining at least one of the first area of overlap and the second area of overlap comprises:
determining the first area of overlap based on Jacobian and Hessian matrices.

23. The robot of claim 18, wherein determining the first area of overlap comprises:
detecting a first edge at a first position in the first image based on a derivative of depth with respect to one or more spatial coordinates of depth data in the first depth image;
detecting a second edge at a second position in the first image based on the derivative of depth with respect to one or more spatial coordinates of depth data in the first depth image;

detecting a third edge in a third position in the second image based on a derivative of depth with respect to one or more spatial coordinates of depth data in the second depth image;

determining that the third edge is not the same edge as the second edge based on shapes of the third edge and the second edge not matching;

determining that the third edge is the same edge as the first edge based on shapes of the first edge and the third edge at least partially matching; and determining the first area of overlap based on a difference between the first position and the third position.

24. The robot of claim 18, wherein determining the first area of overlap comprises:

thresholding the first depth image to form a first thresholded depth image;

thresholding the second depth image to form a second thresholded depth image; and aligning the first thresholded depth image to the second thresholded depth image.

25. The robot of claim 18, wherein determining the first area of overlap comprises:

determining alignment scores of a plurality of candidate alignments based on a Szymkiewicz-Simpson coefficient of overlap between at least part of the first depth image and at least part of the second depth image; and selecting an alignment from among the candidate alignments based on the alignment scores.

26. The robot of claim 18, wherein determining the first area of overlap comprises:

determining an approximate alignment between a reduced resolution version of the first depth image and a reduced resolution version of the second depth image; and refining the approximate alignment by:

determining aggregate amounts of difference between overlapping portions of the first depth image and the second depth image at candidate alignments displaced from the approximate alignment; and selecting a candidate alignment that produces a lowest aggregate amount of difference among the candidate alignments or selecting a candidate alignment that produces an aggregate amount of difference less than a threshold.

27. The robot of claim 18, wherein determining the first area of overlap comprises:

applying a convolution to the first depth image with a kernel function that determines aggregate measures of difference between at least part of the first depth image and at least part of the second depth image based on differences between depths in respective images; and selecting an alignment that the convolution indicates has a smallest aggregate measure of difference.

28. The robot of claim 18, wherein determining the first area of overlap comprises:

obtaining a vector indicative of spatial displacement of the one or more sensors between the first image and the second image in a frame of reference of the working environment; and transforming frames of reference of the second depth image and the first depth image into the same frame of reference based on the vector.

29. The robot of claim 18, wherein determining the spatial model of the working environment comprises:

determining a point cloud model of the working environment based on alignment of the plurality of depth images.

30. The robot of claim 18, wherein determining the spatial model of the working environment comprises:

determining a two-dimensional bitmap representation of obstacles in the working environment based on alignment of the plurality of depth images.

31. The robot of claim 18, wherein determining the spatial model of the working environment comprises:

updating priors of a Bayesian spatial model of the working environment from a previous mapping by the robot.

32. The robot of claim 18, comprising:

simultaneously localizing the robot and mapping the working environment, wherein the spatial model comprises positions of obstacles in the working environment and values indicating confidence scores for those respective positions, wherein:

the confidence scores are based on at least one of the following:

quality of the captured data, noise in perceived depth, similarity between depths recorded from different fields of view, or confident scores of adjacent depths; and determining the spatial model comprises pruning or determining to not add positions of obstacles with a threshold confidence score that fail to satisfy a threshold from, or to, the spatial model.

33. The robot of claim 18, comprising:

cleaning a floor with the robot based on at least part of the spatial model.

34. A method of perceiving a spatial model of a working environment, the method comprising:

capturing data by one or more sensors of a robot moving within the working environment, the data being indicative of depth within the working environment from respective sensors of the robot to objects in the working environment at a plurality of different sensor poses;

obtaining a plurality of depth images based on the captured data, wherein:

respective depth images are based on data captured from different positions within the working environment through which the robot moves, respective depth images comprise a plurality of depth data, the depth data indicating distance from respective sensors to objects within the working environment at respective sensor poses, and depth data of respective depth images correspond to respective fields of view;

aligning depth data of respective depth images based on an area of overlap between the fields of view of the plurality of depth images, wherein the aligning comprises:

determining a first area of overlap between a first depth image and a second depth image among the plurality of depth images by detecting a first edge at a first position in the first image based on a derivative of depth with respect to one or more spatial coordinates of depth data in the first depth image;

detecting a second edge at a second position in the first image based on the derivative of depth with respect to one or more spatial coordinates of depth data in the first depth image;

detecting a third edge in a third position in the second image based on a derivative of depth with respect to one or more spatial coordinates of depth data in the second depth image;

determining that the third edge is not the same edge as the second edge based on shapes of the third edge and the second edge not matching;
determining that the third edge is the same edge as the first edge based on shapes of the first edge and the third edge at least partially matching; and
determining the first area of overlap based on a difference between the first position and the third position; and
determining a second area of overlap between the second depth image and a third depth image among the plurality of depth images, the first area of overlap being at least partially different from the second area of overlap; and
determining, based on alignment of the depth data, a spatial model of the working environment,
wherein at least some data processing of the spatial model is offloaded from the robotic device to the cloud,
wherein the spatial model is further processed to identify rooms in a floor plan, and
wherein the spatial model is stored in memory accessible to the robot during a subsequent operational session for use in autonomously navigating the working environment.

35. The method of claim 34, comprising:
storing at least part of the spatial model of the working environment in memory of the robot;
determining, with one or more processors of the robot, a path of the robot based on the at least part of the spatial model of the working environment; and
controlling, with one or more processors of the robot, an actuator of the robot to cause the robot to move along the determined path.

36. The method of claim 34, wherein:
depth data is associated with respective values indicating respective angular displacements of corresponding depths in respective frames of reference corresponding to respective fields of view;
the depth images are obtained by triangulating object depths based on captured angles at which a laser emitted from the robot and reflecting off respective objects is received at a camera sensor of the robot;
the plurality of depth data comprises a plurality of depth vectors from the sensor to objects within the working environment, respective vectors including at least one coordinate indicating relative position in a respective field of view and at least one coordinate indicating depth; and
at least some of the fields of view partly overlap with a respective preceding field of view.

37. The method of claim 34, wherein determining at least one of the first area of overlap and the second area of overlap comprises:
determining the first area of overlap based on Jacobian and Hessian matrices.

38. The method of claim 34, wherein determining the first area of overlap comprises:
thresholding the first depth image to form a first thresholded depth image;
thresholding the second depth image to form a second thresholded depth image; and
aligning the first thresholded depth image to the second thresholded depth image.

39. The method of claim 34, wherein determining the first area of overlap comprises:
determining alignment scores of a plurality of candidate alignments based on a Szymkiewicz-Simpson coefficient of overlap between at least part of the first depth image and at least part of the second depth image; and
selecting an alignment from among the candidate alignments based on the alignment scores.

40. A robot, comprising:
an actuator configured to move a robot through a working environment;
one or more sensors mechanically coupled to the robot;
one or more processors configured to receive sensed data from the one or more sensors and control the actuator; and
memory storing instructions that when executed by at least some of the processors effectuate operations comprising:
capturing data by one or more sensors of a robot moving within the working environment, the data being indicative of depth within the working environment from respective sensors of the robot to objects in the working environment at a plurality of different sensor poses;
obtaining a plurality of depth images based on the captured data, wherein:
respective depth images are based on data captured from different positions within the working environment through which the robot moves,
respective depth images comprise a plurality of depth data, the depth data indicating distance from respective sensors to objects within the working environment at respective sensor poses, and
depth data of respective depth images correspond to respective fields of view;
aligning depth data of respective depth images based on an area of overlap between the fields of view of the plurality of depth images, wherein the aligning comprises:
determining a first area of overlap between a first depth image and a second depth image among the plurality of depth images by
detecting a first edge at a first position in the first image based on a derivative of depth with respect to one or more spatial coordinates of depth data in the first depth image;
detecting a second edge at a second position in the first image based on the derivative of depth with respect to one or more spatial coordinates of depth data in the first depth image;
detecting a third edge in a third position in the second image based on a derivative of depth with respect to one or more spatial coordinates of depth data in the second depth image;
determining that the third edge is not the same edge as the second edge based on shapes of the third edge and the second edge not matching;
determining that the third edge is the same edge as the first edge based on shapes of the first edge and the third edge at least partially matching; and
determining the first area of overlap based on a difference between the first position and the third position; and
determining a second area of overlap between the second depth image and a third depth image among the plurality of depth images, the first area of overlap being at least partially different from the second area of overlap; and
determining, based on alignment of the depth data, a spatial model of the working environment, wherein at least some data processing of the spatial model is offloaded from the robotic device to the cloud, wherein the spatial model is further processed to identify rooms in a floor plan, and wherein the spatial model is stored in memory accessible to the robot during a subsequent operational session for use in autonomously navigating the working environment.

41. The robot of claim 40, wherein determining the first area of overlap comprises:

applying a convolution to the first depth image with a kernel function that determines aggregate measures of difference between at least part of the first depth image and at least part of the second depth image based on differences between depths in respective images; and selecting an alignment that the convolution indicates has a smallest aggregate measure of difference.

42. The robot of claim 40, wherein determining the first area of overlap comprises:

obtaining a vector indicative of spatial displacement of the one or more sensors between the first image and the second image in a frame of reference of the working environment; and transforming frames of reference of the second depth image and the first depth image into the same frame of reference based on the vector.

43. The robot of claim 40, wherein determining the spatial model of the working environment comprises:

determining a point cloud model of the working environment based on alignment of the plurality of depth images.

44. The robot of claim 40, wherein determining the spatial model of the working environment comprises:

determining a two-dimensional bitmap representation of obstacles in the working environment based on alignment of the plurality of depth images.

45. The robot of claim 40, comprising:

simultaneously localizing the robot and mapping the working environment, wherein the spatial model comprises positions of obstacles in the working environment and values indicating confidence scores for those respective positions, wherein:

the confidence scores are based on at least one of the following:
quality of the captured data,
noise in perceived depth,
similarity between depths recorded from different fields of view, or
confident scores of adjacent depths; and determining the spatial model comprises pruning or determining to not add positions of obstacles with a threshold confidence score that fail to satisfy a threshold from, or to, the spatial model.

46. A method of perceiving a spatial model of a working environment, the method comprising:

capturing data by one or more sensors of a robot moving within the working environment, the data being indicative of depth within the working environment from respective sensors of the robot to objects in the working environment at a plurality of different sensor poses;

obtaining a plurality of depth images based on the captured data, wherein:

respective depth images are based on data captured from different positions within the working environment through which the robot moves, respective depth images comprise a plurality of depth data, the depth data indicating distance from respective sensors to objects within the working environment at respective sensor poses, and depth data of respective depth images correspond to respective fields of view;

aligning depth data of respective depth images based on an area of overlap between the fields of view of the plurality of depth images, wherein the aligning comprises:

determining a first area of overlap between a first depth image and a second depth image among the plurality of depth images by determining an approximate alignment between a reduced resolution version of the first depth image and a reduced resolution version of the second depth image; and refining the approximate alignment by:

determining aggregate amounts of difference between overlapping portions of the first depth image and the second depth image at candidate alignments displaced from the approximate alignment; and selecting a candidate alignment that produces a lowest aggregate amount of difference among the candidate alignments or selecting a candidate alignment that produces an aggregate amount of difference less than a threshold; and determining a second area of overlap between the second depth image and a third depth image among the plurality of depth images, the first area of overlap being at least partially different from the second area of overlap; and determining, based on alignment of the depth data, a spatial model of the working environment, wherein at least some data processing of the spatial model is offloaded from the robotic device to the cloud, wherein the spatial model is further processed to identify rooms in a floor plan, and wherein the spatial model is stored in memory accessible to the robot during a subsequent operational session for use in autonomously navigating the working environment.

47. The method of claim 46, comprising:

storing at least part of the spatial model of the working environ ent in memory of the robot;

determining, with one or more processors of the robot, a path of the robot based on the at least part of the spatial model of the working environment; and controlling, with one or more processors of the robot; an actuator of the robot to cause the robot to move along the determined path.

48. The method of claim 46, wherein:

depth data is associated with respective values indicating respective angular displacements of corresponding depths in respective frames of reference corresponding to respective fields of view;

the depth images are obtained by triangulating object depths based on captured angles at which a laser emitted from the robot and reflecting off respective objects is received at a camera sensor of the robot;

the plurality of depth data comprises a plurality of depth vectors from the sensor to objects within the working environment, respective vectors including at least one coordinate indicating relative position in a respective field of view and at least one coordinate indicating depth; and at least some of the fields of view partly overlap with a respective preceding field of view.

49. The method of claim 46, wherein determining at least one of the first area of overlap and the second area of overlap comprises:
   determining the first area of overlap based on Jacobian and Hessian matrices.

50. The method of claim 46, wherein determining the first area of overlap comprises:
   thresholding the first depth image to form a first thresholded depth image;
   thresholding the second depth image to form a second thresholded depth image; and
   aligning the first thresholded depth image to the second thresholded depth image.

51. The method of claim 46, wherein determining the first area of overlap comprises:
   determining alignment scores of a plurality of candidate alignments based on a Szymkiewicz-Simpson coefficient of overlap between at least part of the first depth image and at least part of the second depth image; and
   selecting an alignment from among the candidate alignments based on the alignment scores.

52. A robot, comprising:
   an actuator configured to move a robot through a working environment;
   one or more sensors mechanically coupled to the robot;
   one or more processors configured to receive sensed data from the one or more sensors and control the actuator; and
   memory storing instructions that when executed by at least some of the processors effectuate operations comprising:
      capturing data by one or more sensors of a robot moving within the working environment, the data being indicative of depth within the working environment from respective sensors of the robot to objects in the working environment at a plurality of different sensor poses;
      obtaining a plurality of depth images based on the captured data, wherein:
         respective depth images are based on data captured from different positions within the working environment through which the robot moves,
         respective depth images comprise a plurality of depth data, the depth data indicating distance from respective sensors to objects within the working environment at respective sensor poses, and
         depth data of respective depth images correspond to respective fields of view;
      aligning depth data of respective depth images based on an area of overlap between the fields of view of the plurality of depth images, wherein the aligning comprises:
         determining a first area of overlap between a first depth image and a second depth image among the plurality of depth images by:
            determining an approximate alignment between a reduced resolution version of the first depth image and a reduced resolution version of the second depth image; and
            refining the approximate alignment by:
               determining aggregate amounts of difference between overlapping portions of the first depth image and the second depth image at candidate alignments displaced from the approximate alignment; and
               selecting a candidate alignment that produces a lowest aggregate amount of difference among the candidate alignments or selecting a candidate alignment that produces an aggregate amount of difference less than a threshold; and
         determining a second area of overlap between the second depth image and a third depth image among the plurality of depth images, the first area of overlap being at least partially different from the second area of overlap; and
      determining, based on alignment of the depth data, a spatial model of the working environment,
   wherein at least some data processing of the spatial model is offloaded from the robotic device to the cloud,
   wherein the spatial model is further processed to identify rooms in a floor plan, and
   wherein the spatial model is stored in memory accessible to the robot during a subsequent operational session for use in autonomously navigating the working environment.

53. The robot of claim 52, wherein determining the first area of overlap comprises:
   applying a convolution to the first depth image with a kernel function that determines aggregate measures of difference between at least part of the first depth image and at least part of the second depth image based on differences between depths in respective images; and
   selecting an alignment that the convolution indicates has a smallest aggregate measure of difference.

54. The robot of claim 52, wherein determining the first area of overlap comprises:
   obtaining a vector indicative of spatial displacement of the one or more sensors between the first image and the second image in a frame of reference of the working environment; and
   transforming frames of reference of the second depth image and the first depth image into the same frame of reference based on the vector.

55. The robot of claim 52, wherein determining the spatial model of the working environment comprises:
   determining a point cloud model of the working environment based on alignment of the plurality of depth images.

56. The robot of claim 52, wherein determining the spatial model of the working environment comprises:
   determining a two-dimensional bitmap representation of obstacles in the working environment based on alignment of the plurality of depth images.

57. The robot of claim 52, comprising:
   simultaneously localizing the robot and mapping the working environment, wherein the spatial model comprises positions of obstacles in the working environment and values indicating confidence scores for those respective positions, wherein:
   the confidence scores are based on at least one of the following:
      quality of the captured data,
      noise in perceived depth,
      similarity between depths recorded from different fields of view, or
      confident scores of adjacent depths; and
   determining the spatial model comprises pruning or determining to not add positions of obstacles with a threshold confidence score that fail to satisfy a threshold from, or to, the spatial model.

* * * * *